United States Patent [19]
Mukaiya

[11] Patent Number: 5,583,697
[45] Date of Patent: Dec. 10, 1996

[54] REAR-FOCUS TYPE ZOOM LENS WITH MOVABLE SECOND AND FOURTH LENS UNITS FOR ZOOMING AND FOCUSING

[75] Inventor: Hitoshi Mukaiya, Yokohama, Japan

[73] Assignee: Canon Kabushiki Kaisha, Tokyo, Japan

[21] Appl. No.: 230,801

[22] Filed: Apr. 21, 1994

[30] Foreign Application Priority Data

Apr. 26, 1993 [JP] Japan .................................. 5-099542

[51] Int. Cl.⁶ .................................................. G02B 15/14
[52] U.S. Cl. ........................... 359/687; 359/684; 359/708
[58] Field of Search .................................... 359/687, 684, 359/708

[56] References Cited

U.S. PATENT DOCUMENTS

| | | | |
|---|---|---|---|
| 4,818,083 | 4/1989 | Mihara | 359/687 |
| 5,009,492 | 4/1991 | Hamano | 359/684 |
| 5,056,900 | 10/1991 | Mukaiya et al. | 359/676 |

FOREIGN PATENT DOCUMENTS

| | | |
|---|---|---|
| 62-24213 | 2/1987 | Japan . |
| 62-215225 | 9/1987 | Japan . |
| 62-206516 | 9/1987 | Japan . |
| 4-26811 | 1/1992 | Japan . |
| 4-19165 | 1/1992 | Japan . |
| 4-43311 | 2/1992 | Japan . |
| 4-88309 | 3/1992 | Japan . |
| 4-153615 | 5/1992 | Japan . |
| 5-27167 | 2/1993 | Japan . |
| 5-60973 | 3/1993 | Japan . |
| 5-60974 | 3/1993 | Japan . |

*Primary Examiner*—David C. Nelms
*Assistant Examiner*—Andrew Q. Tran
*Attorney, Agent, or Firm*—Fitzpatrick, Cella, Harper & Scinto

[57] ABSTRACT

A rear focus type zoom lens including, in succession from the object side, a first lens unit of positive refractive power, a second lens unit of negative refractive power, a third lens unit of positive refractive power having a stop, the third lens unit having at least two positive lenses and a negative lens which is most adjacent to the image plane side, and a fourth lens unit of positive refractive power consisting of a positive lens and a negative lens, the second lens unit and the fourth lens unit being moved to effect zooming, the fourth lens unit being moved to effect focusing.

8 Claims, 20 Drawing Sheets

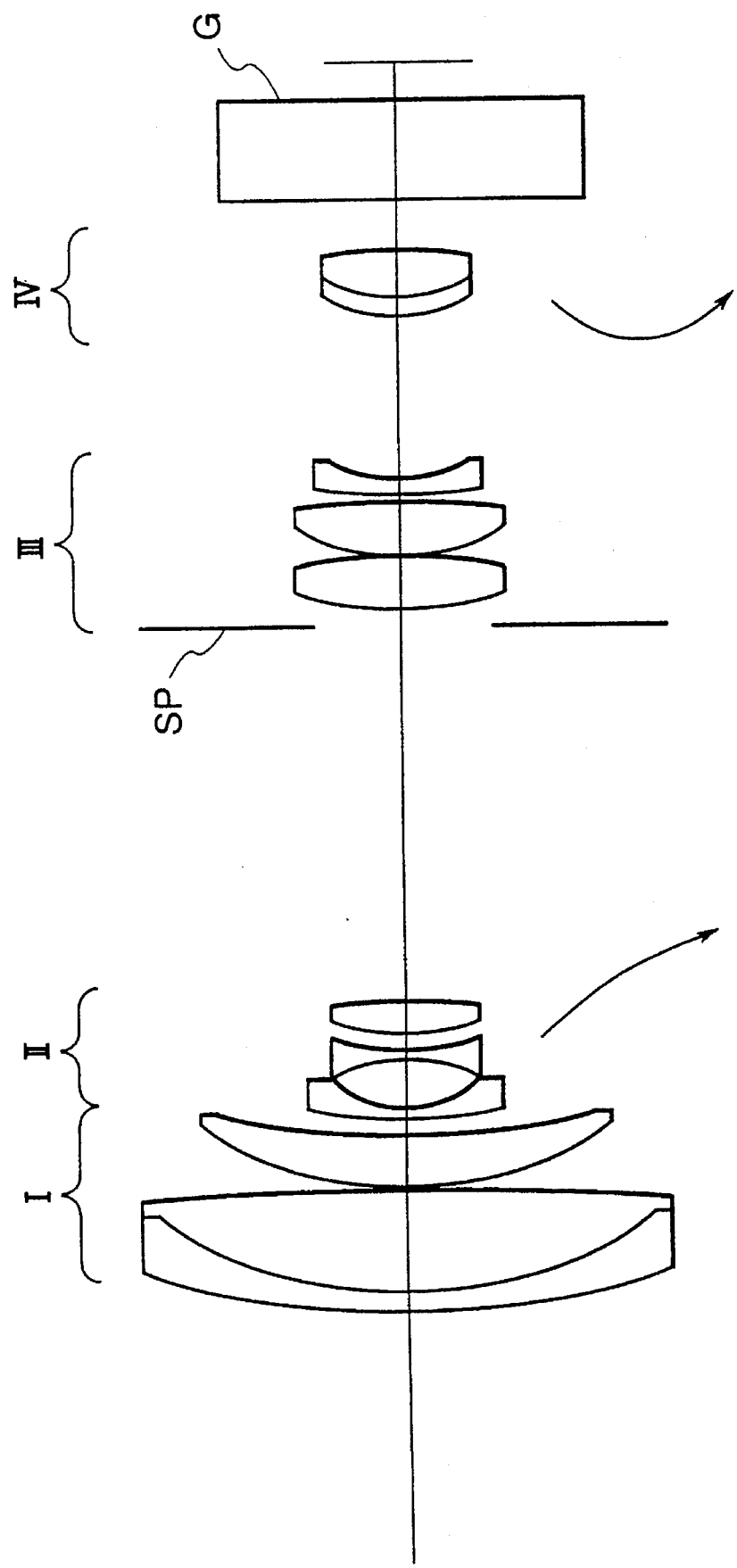

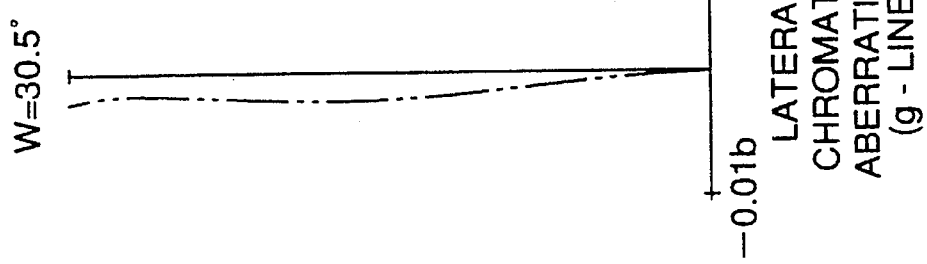
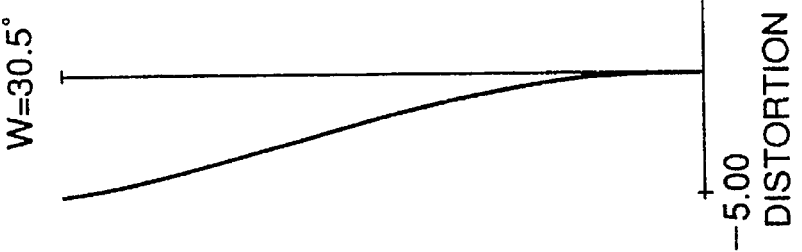
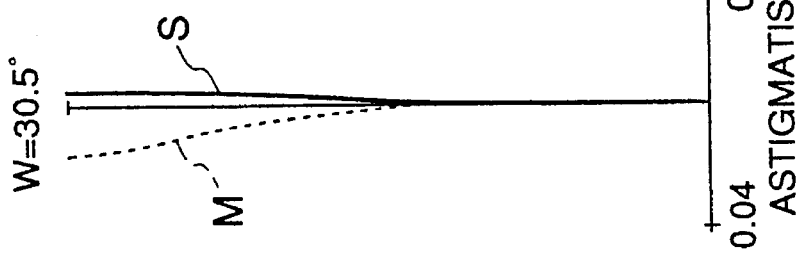
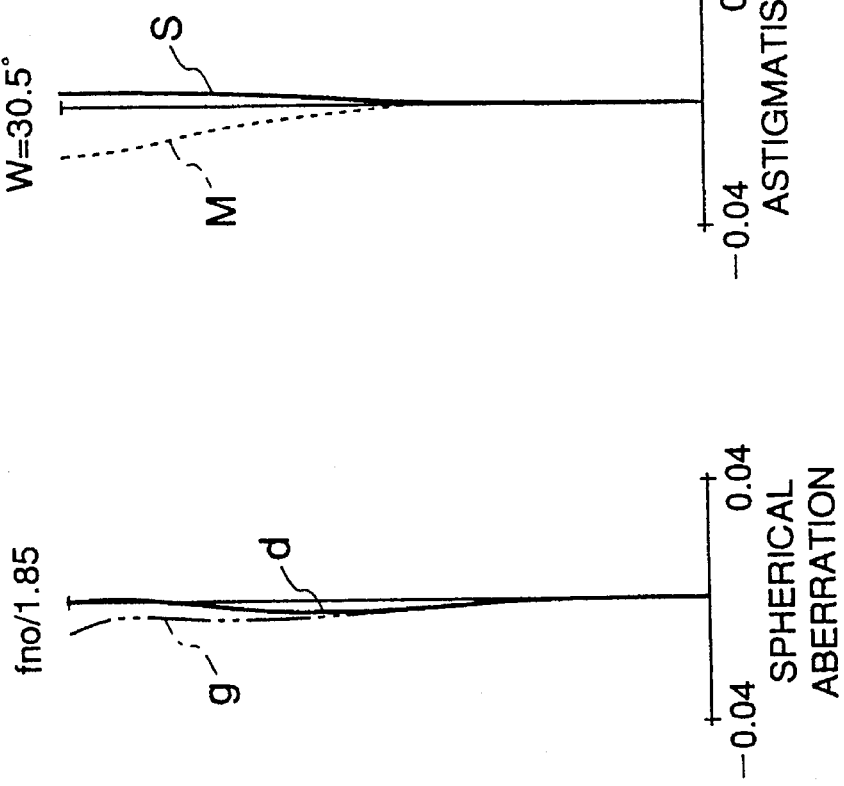

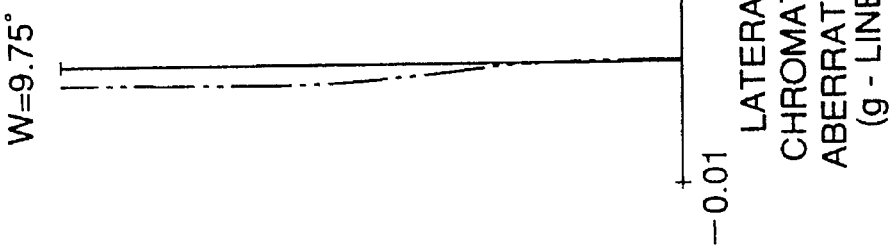
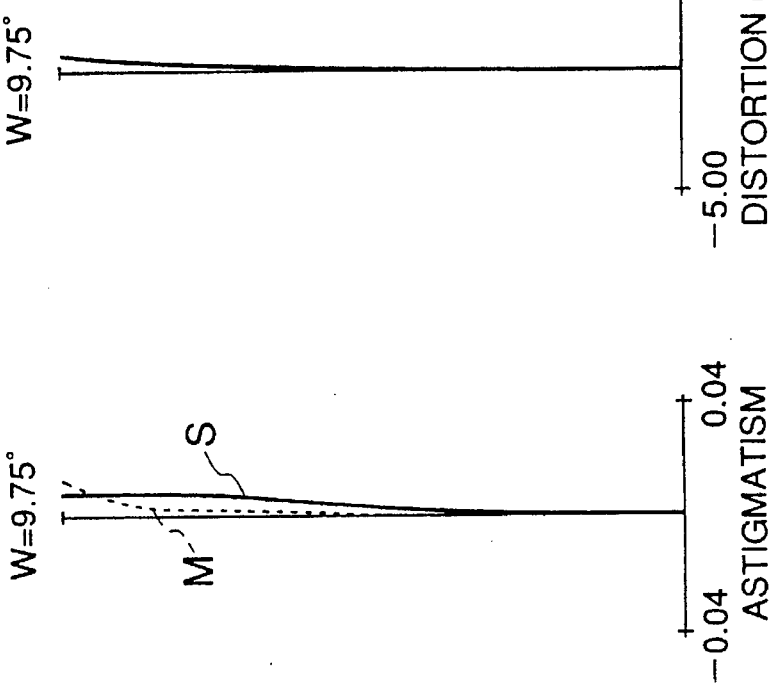
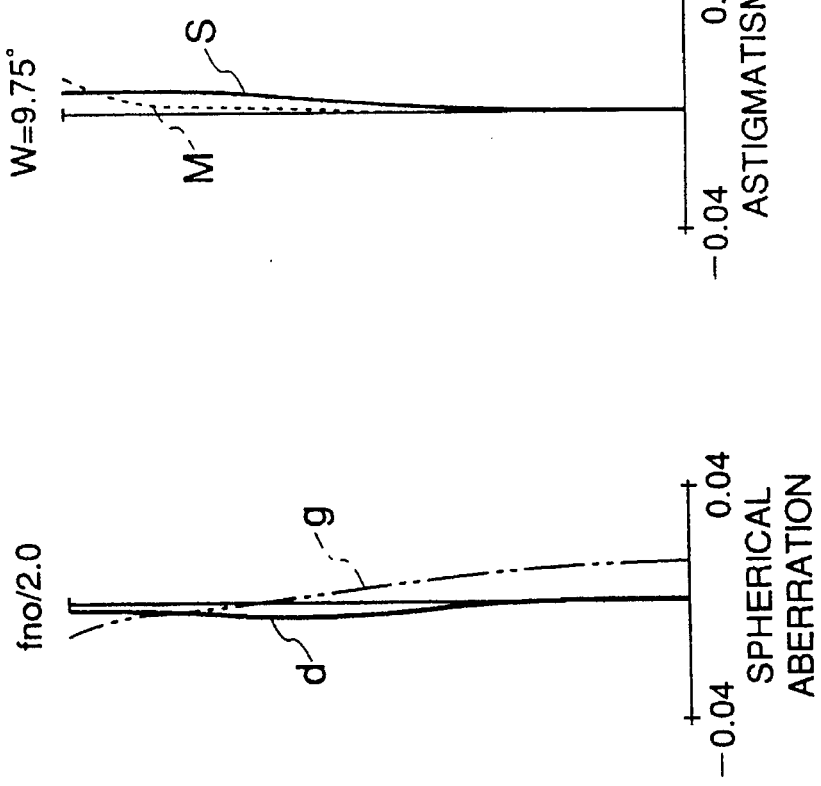

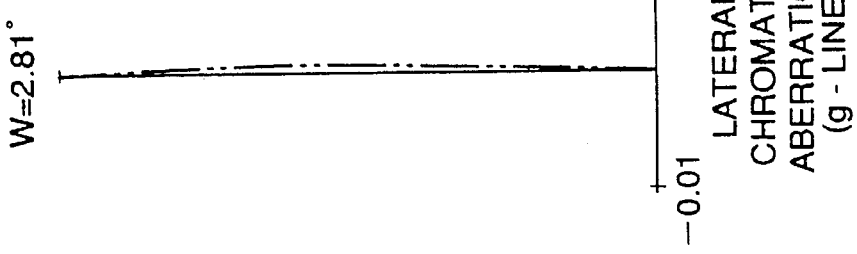
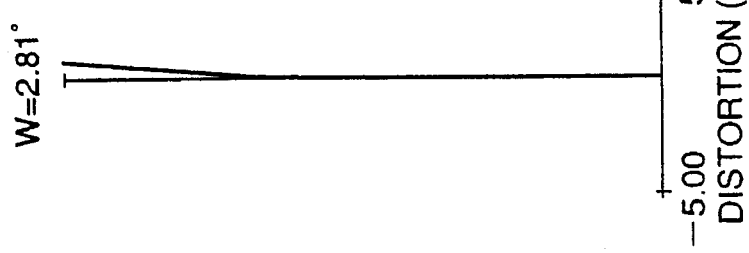
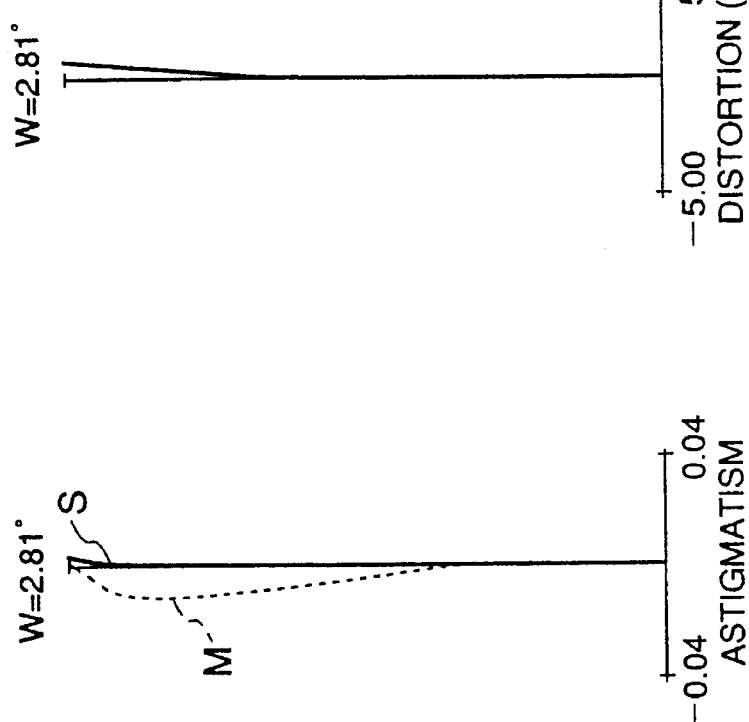
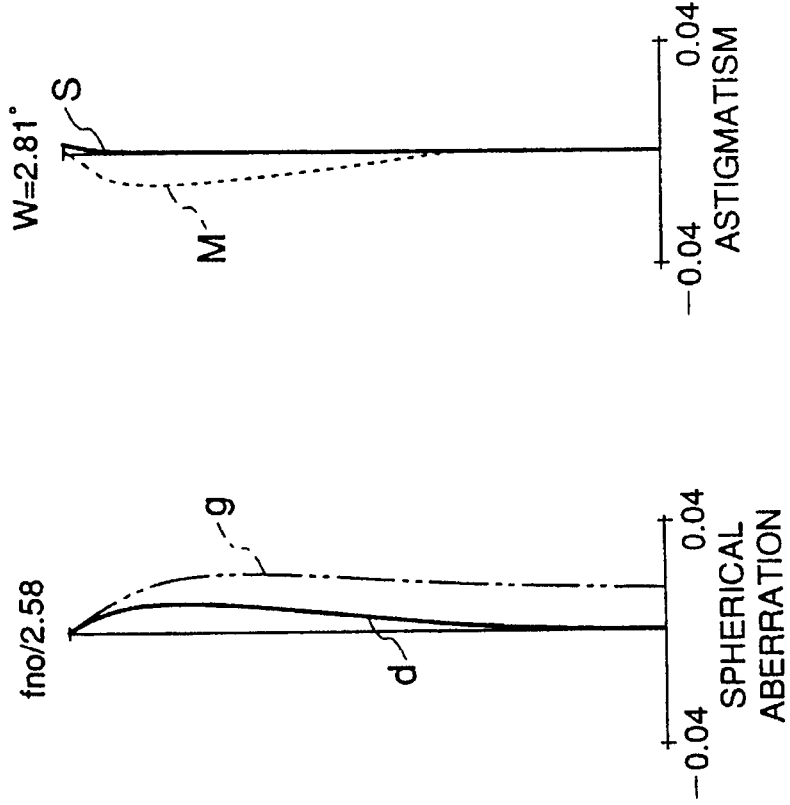

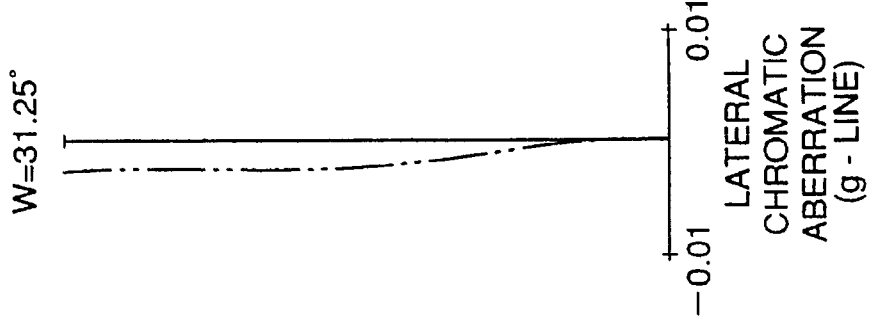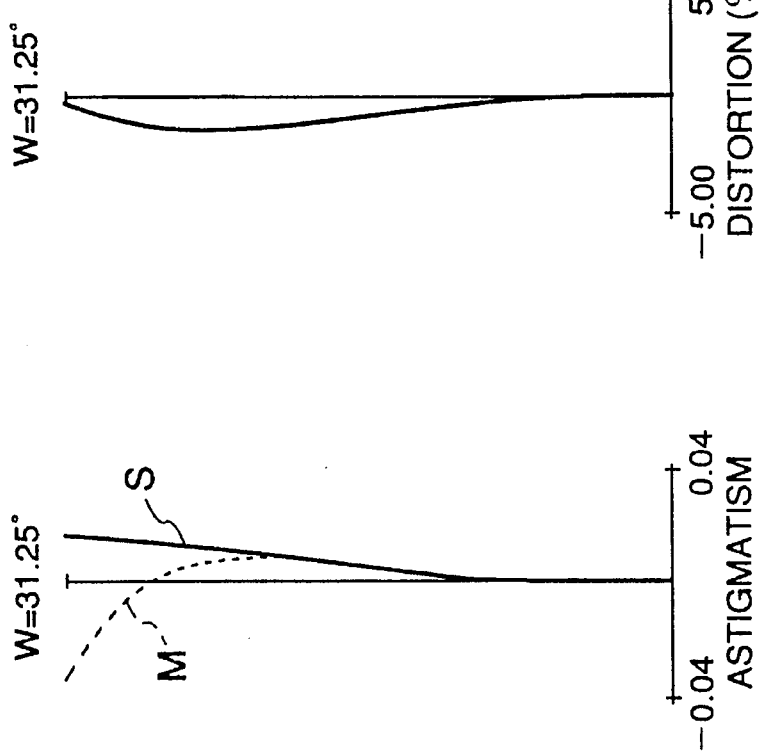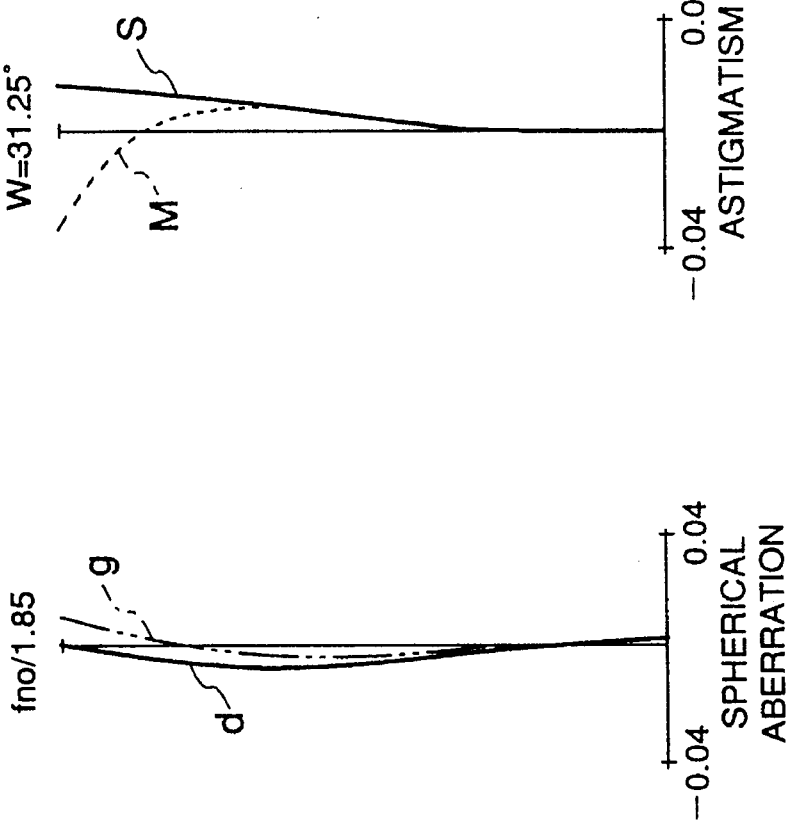

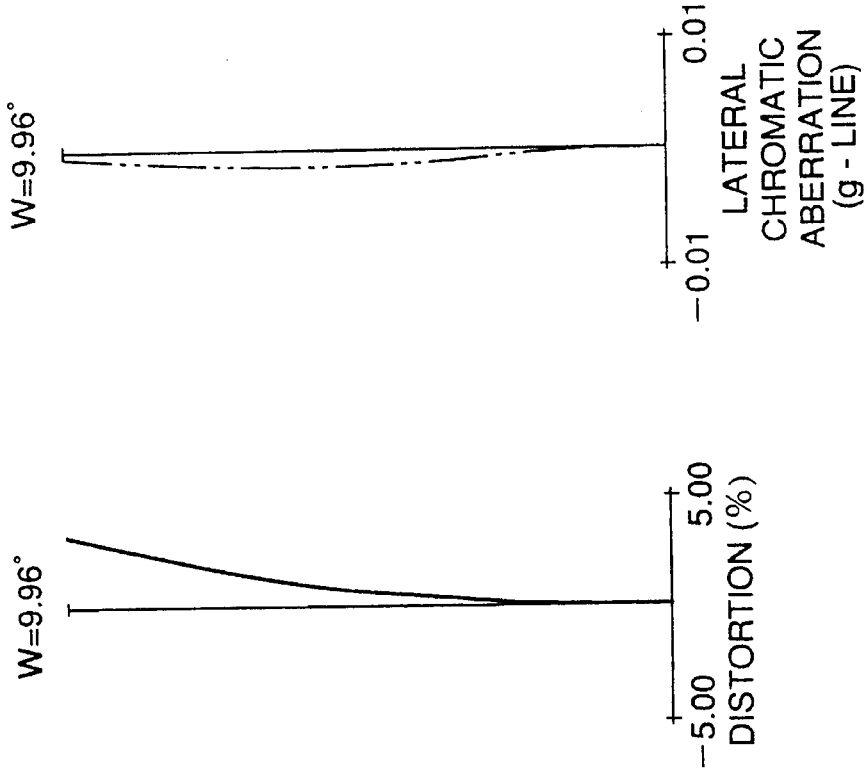
FIG.4E  FIG.4F  FIG.4G  FIG.4H
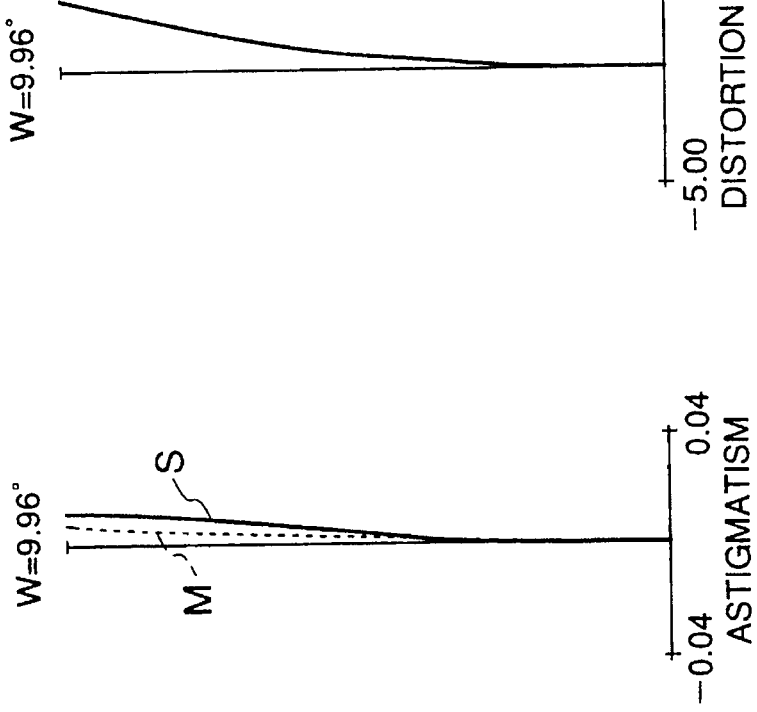
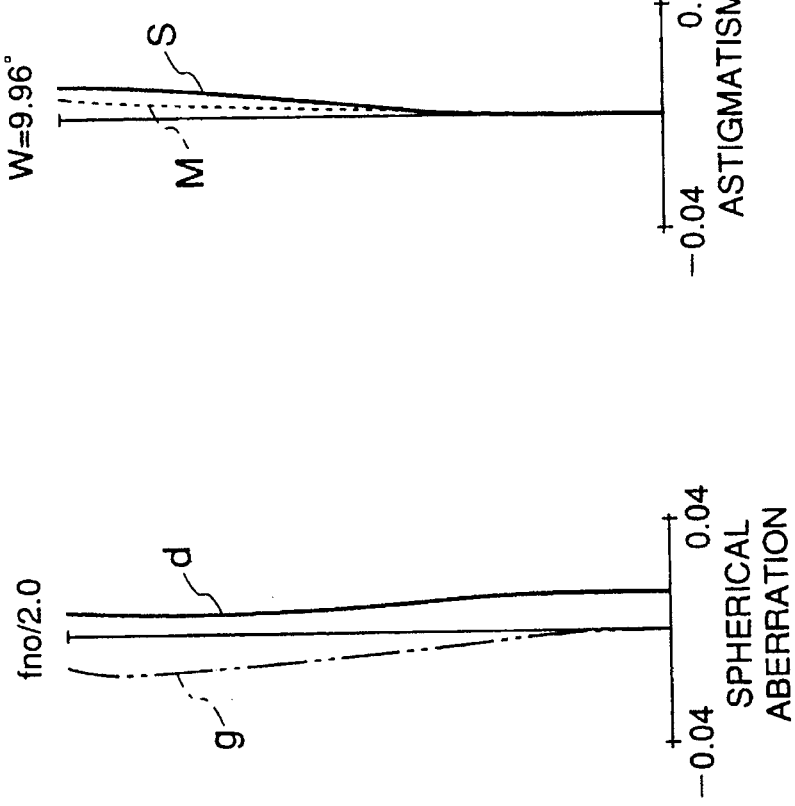

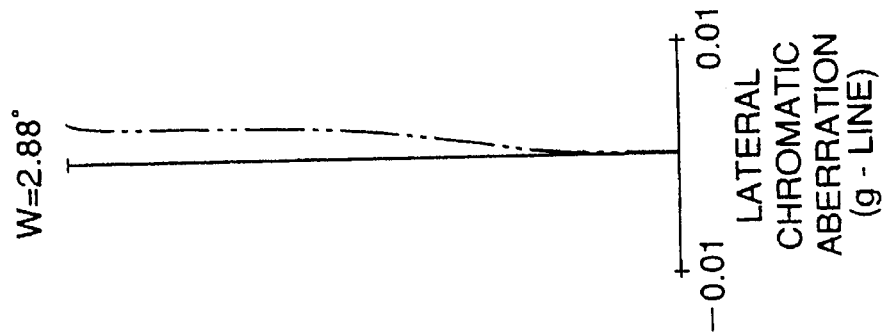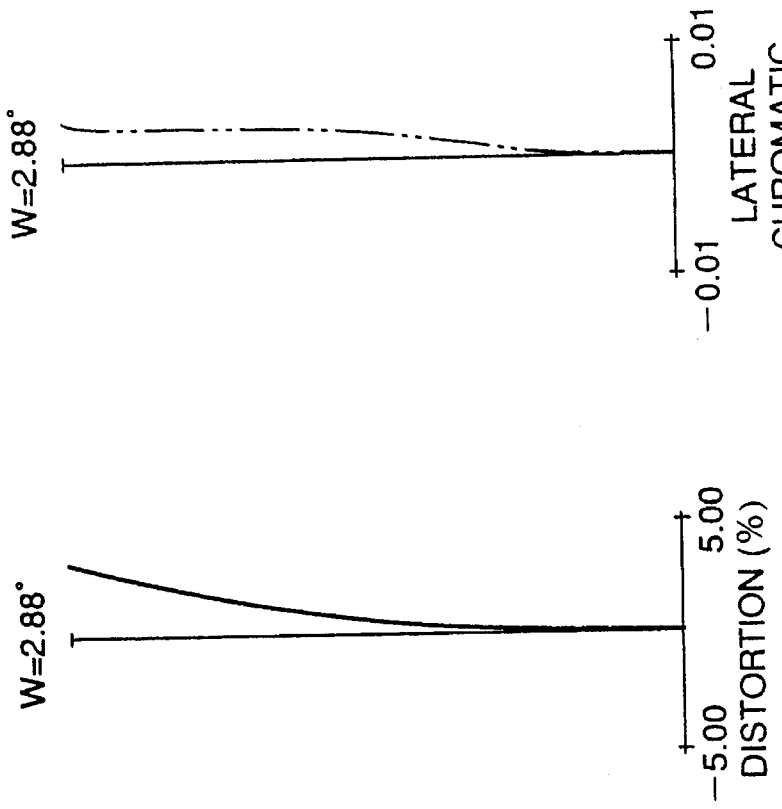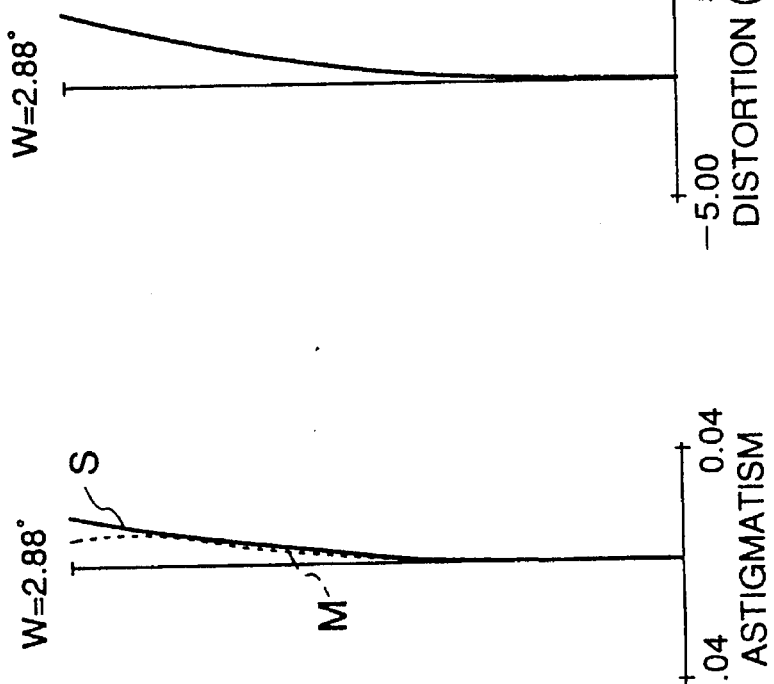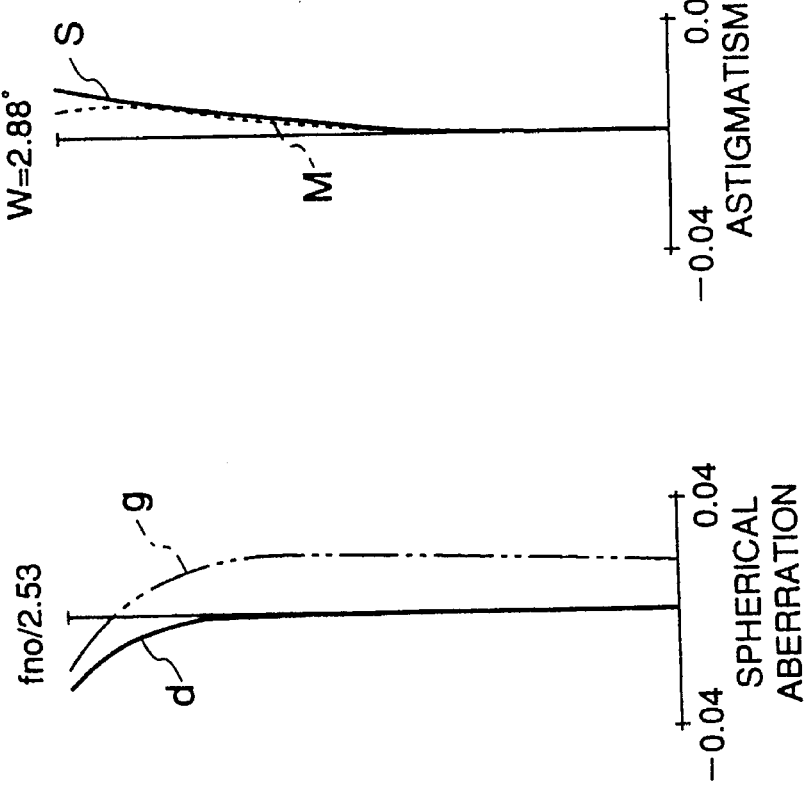

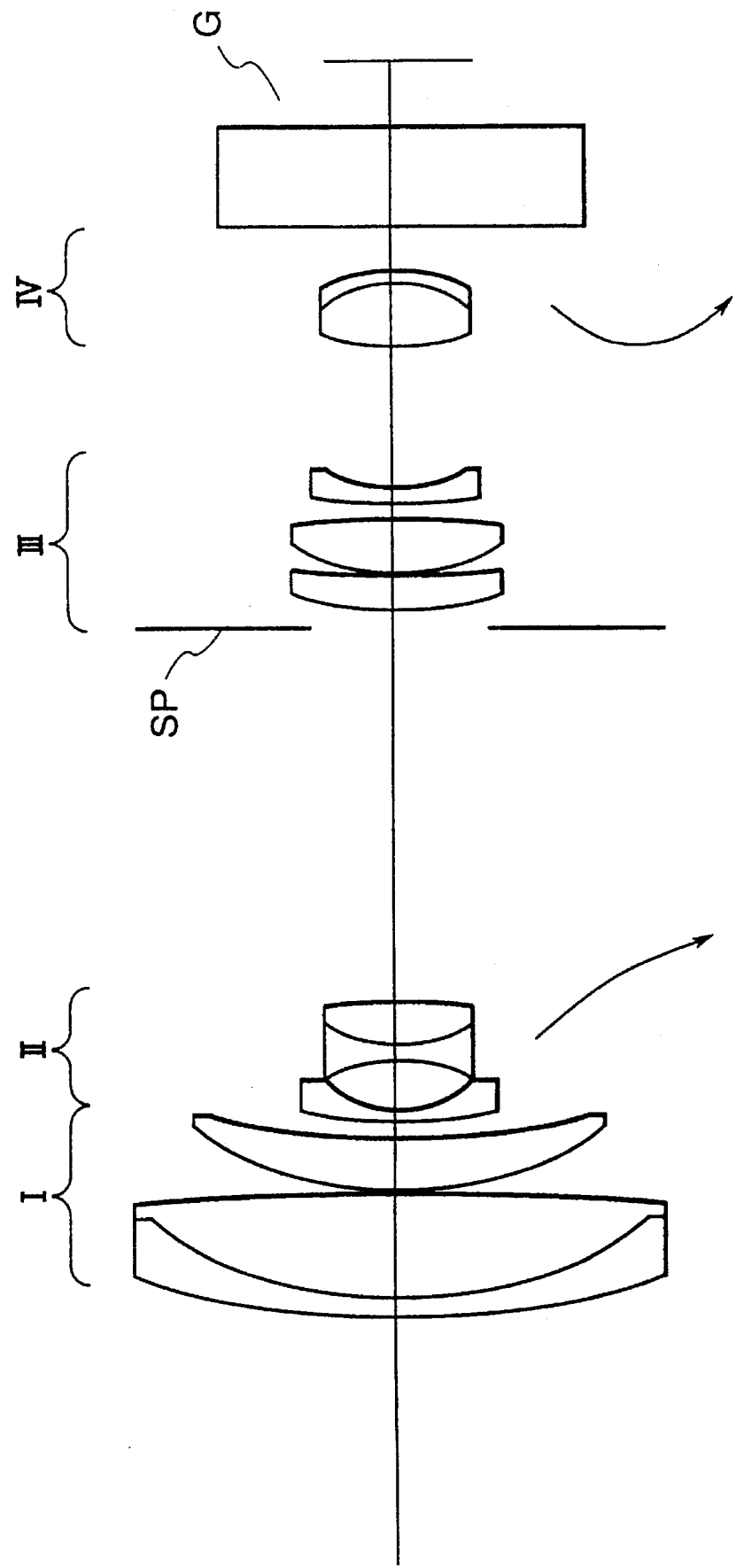

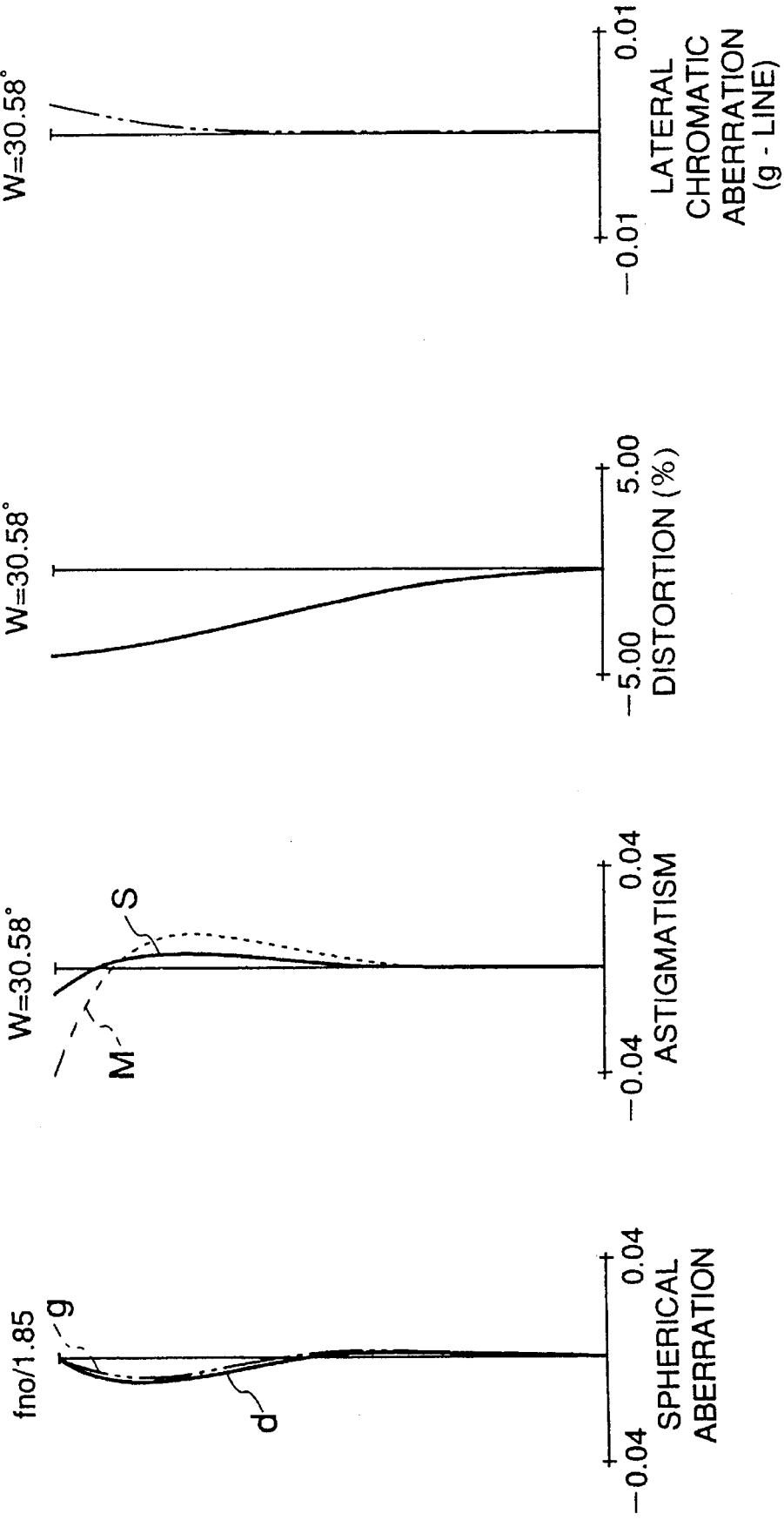

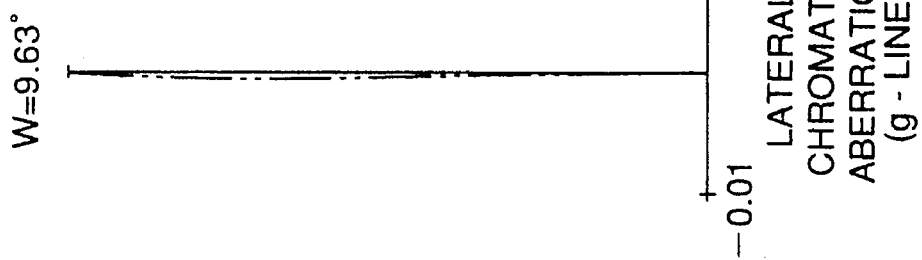
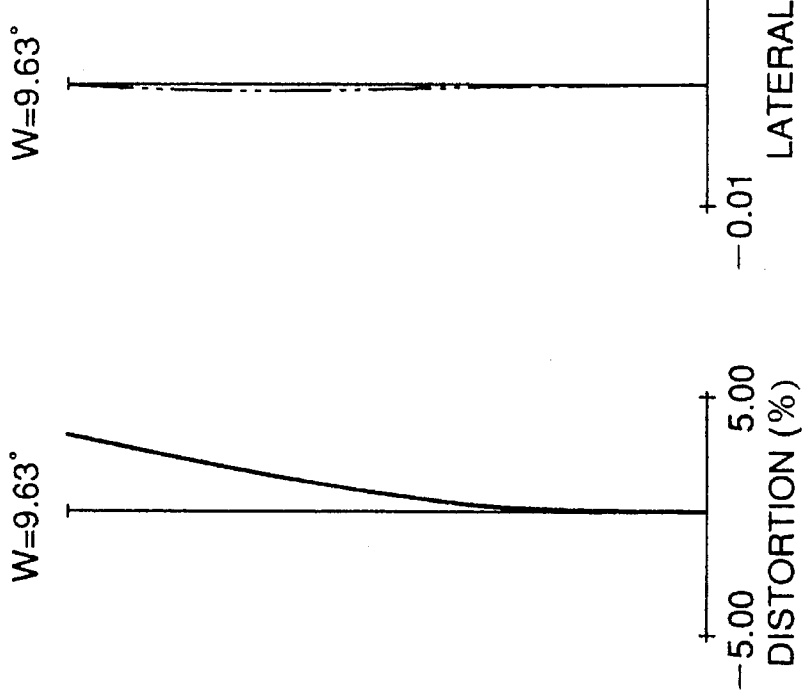
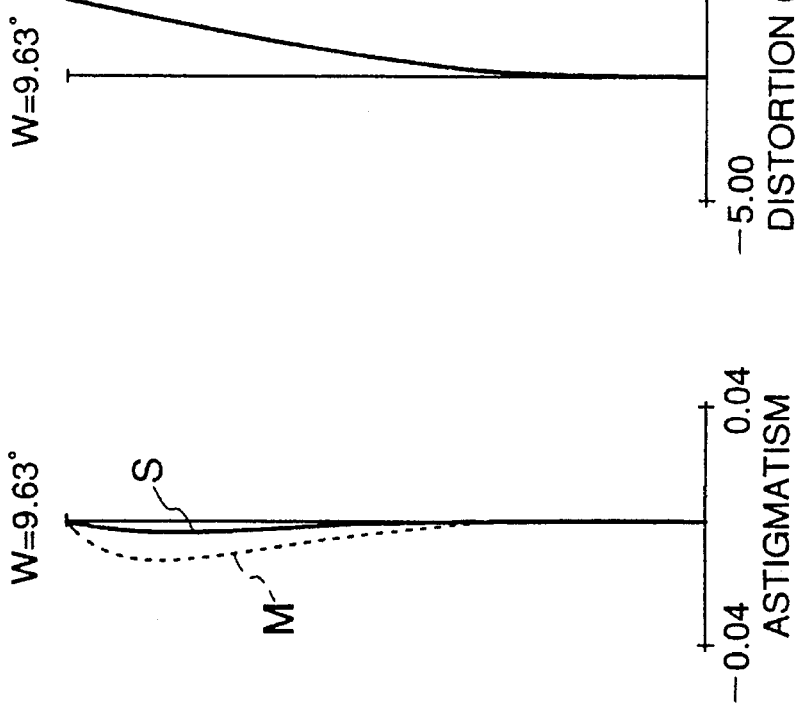
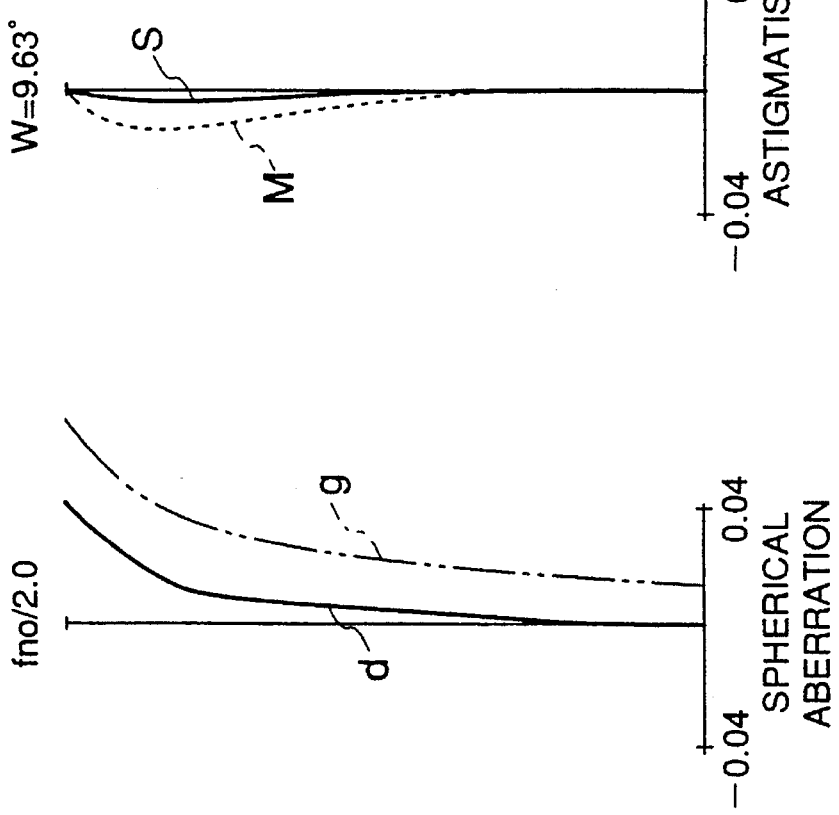

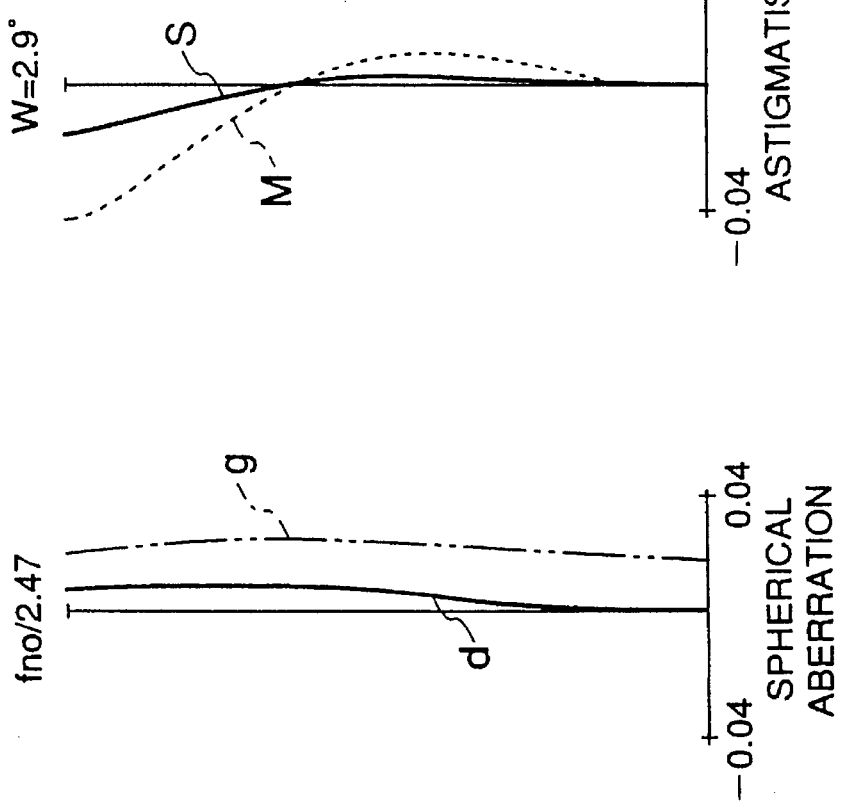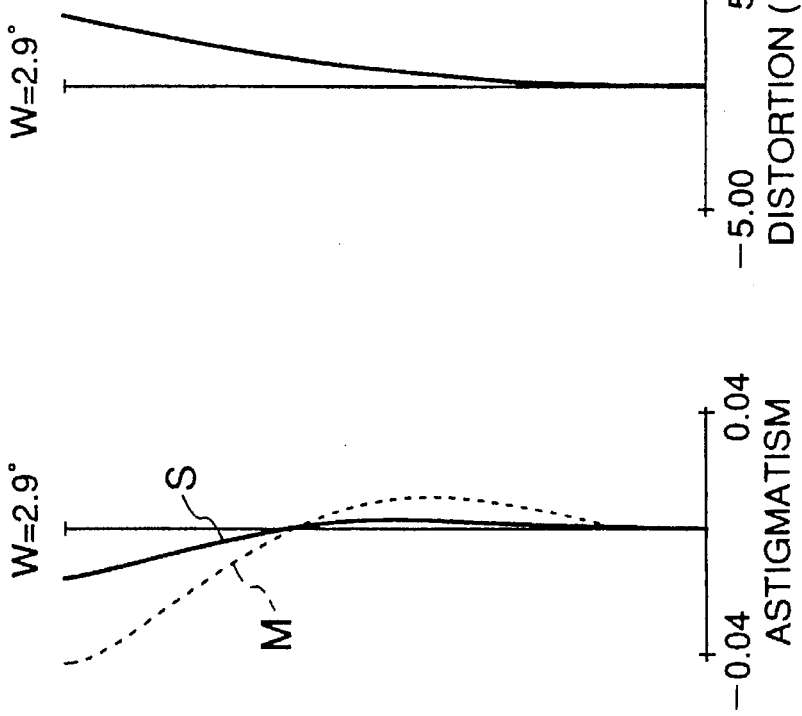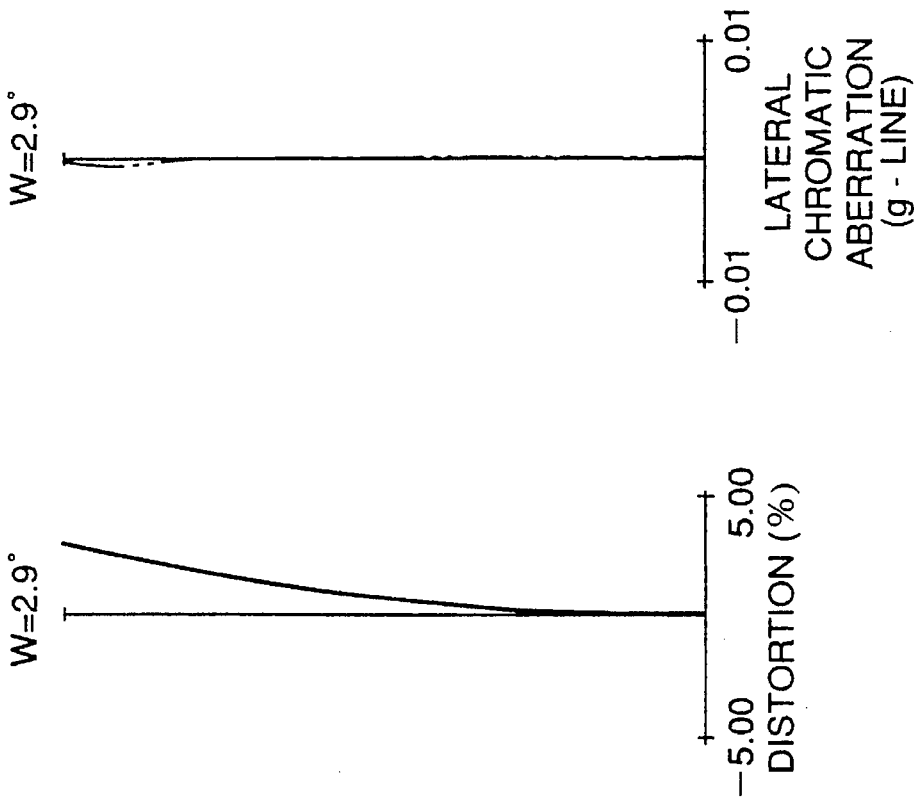

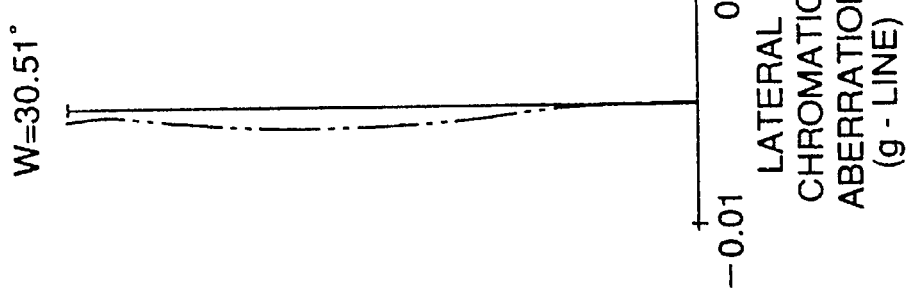
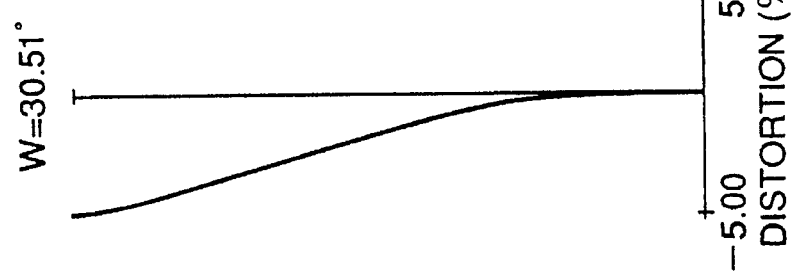
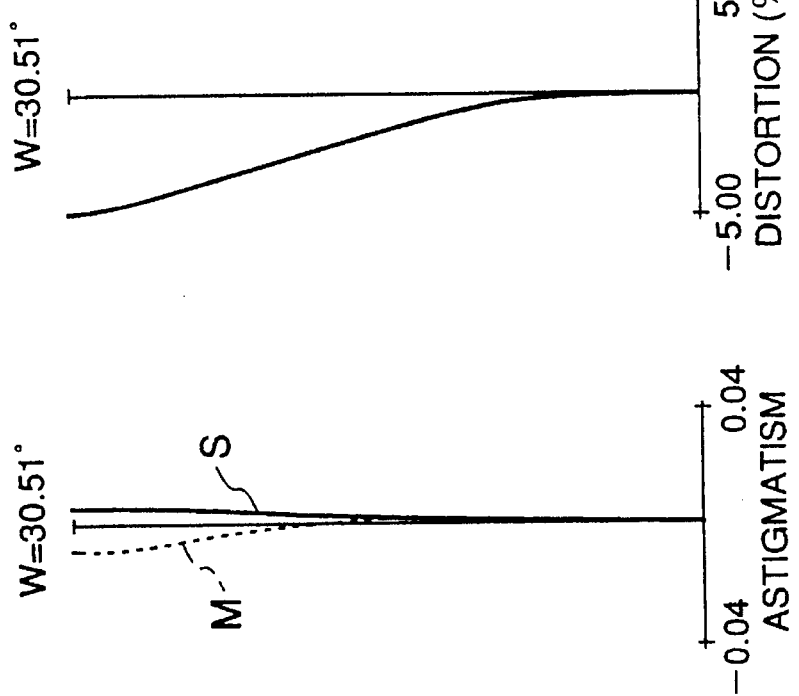
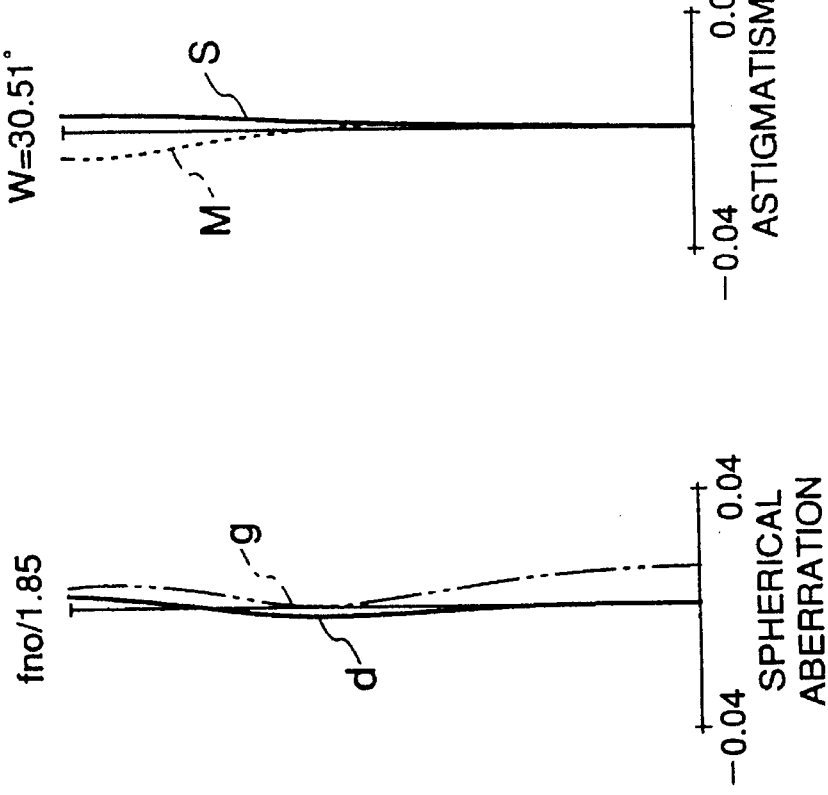

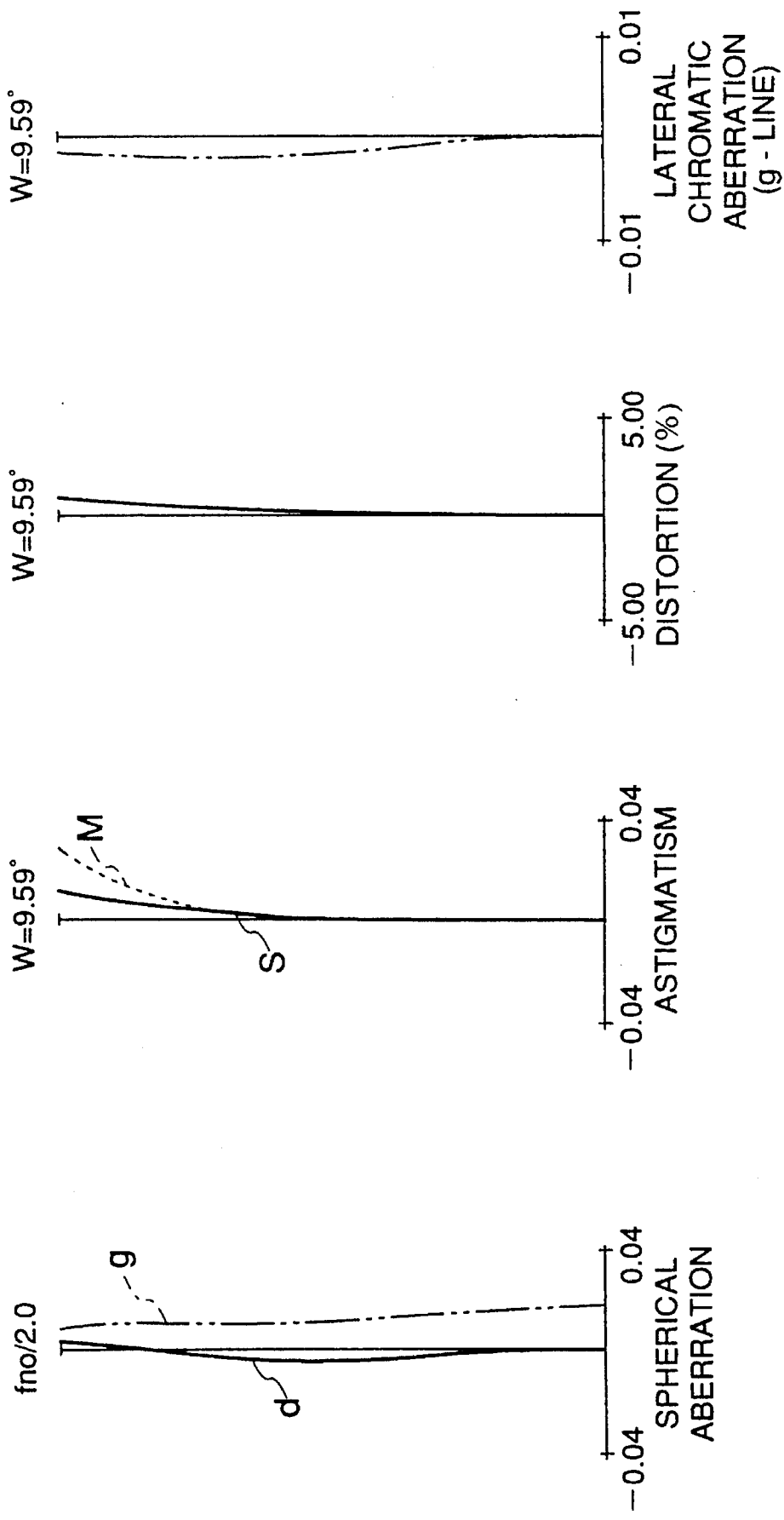

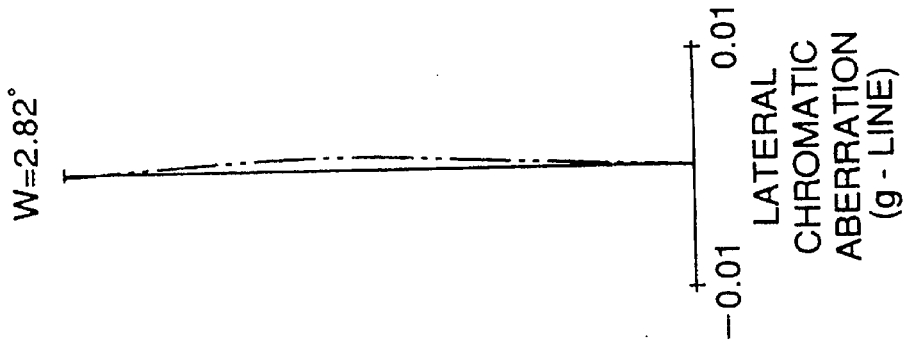
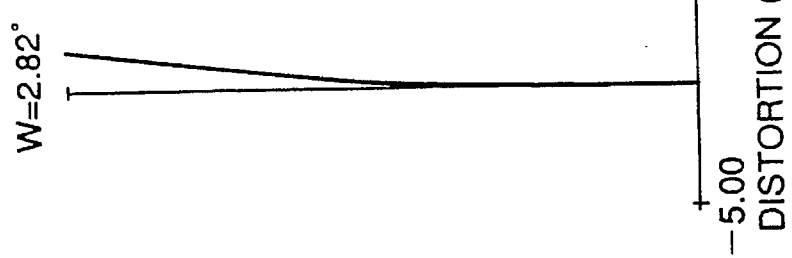
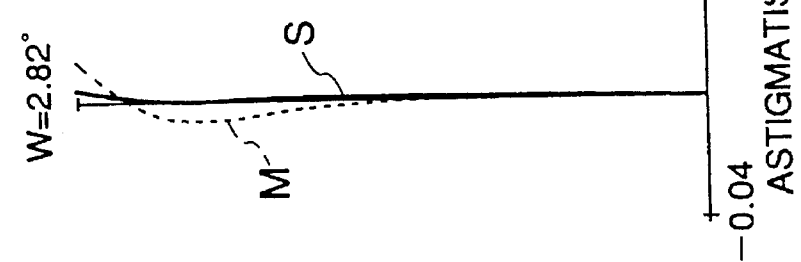
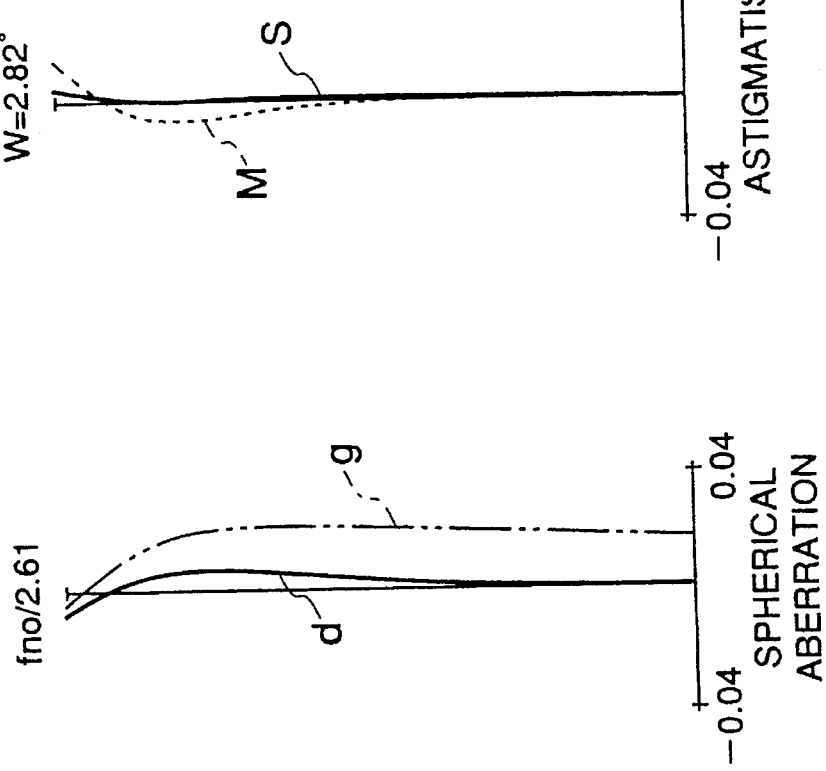

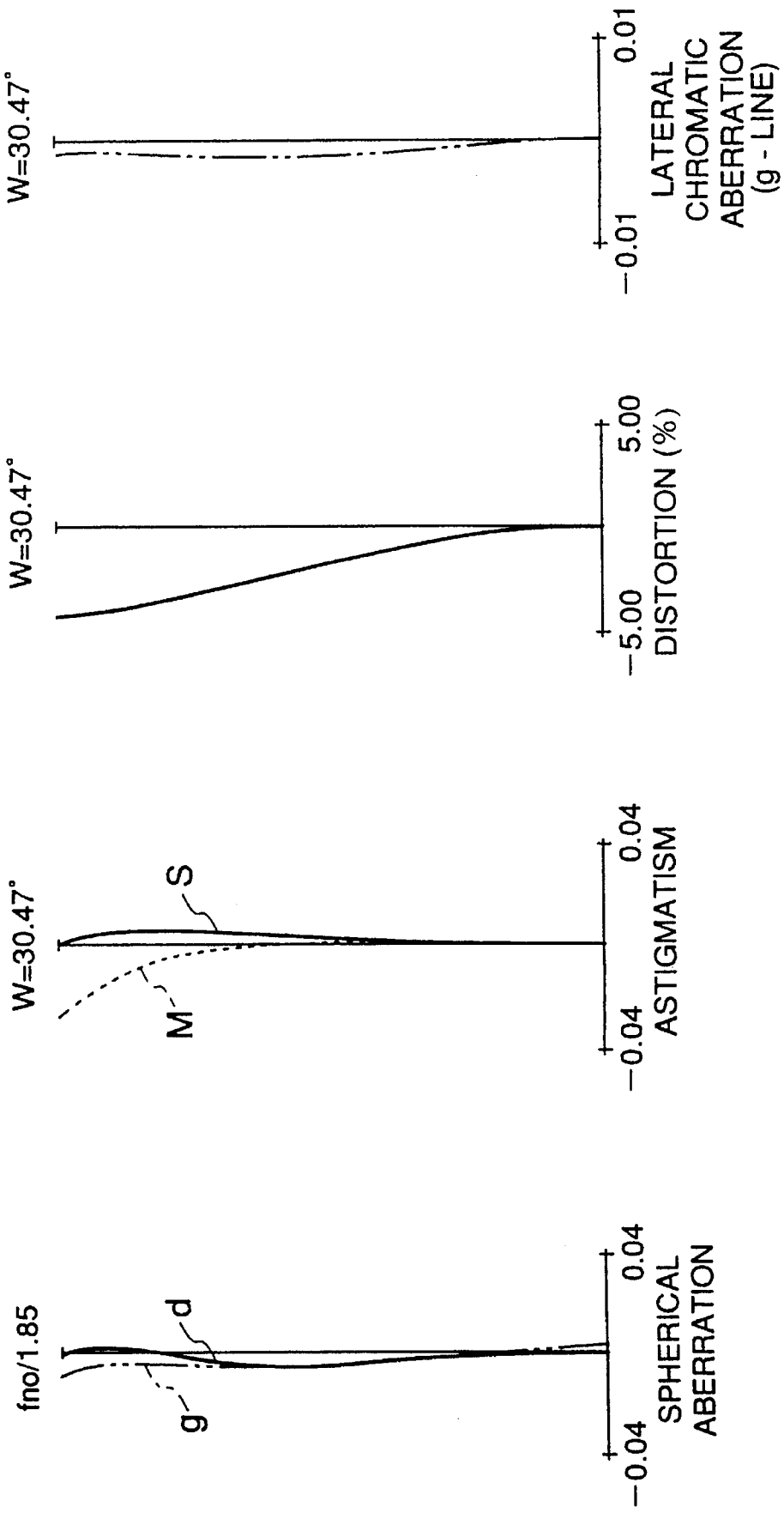

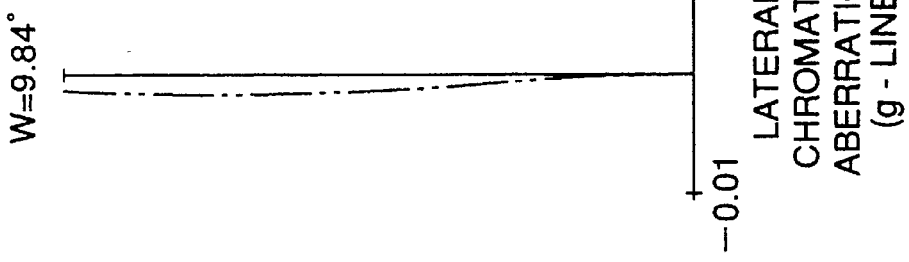
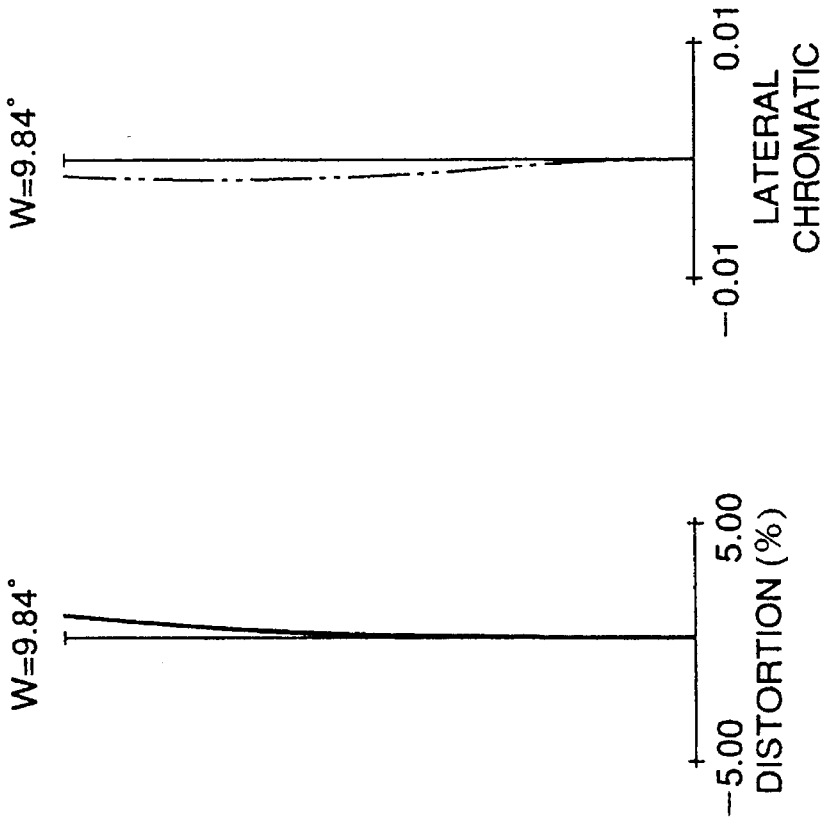
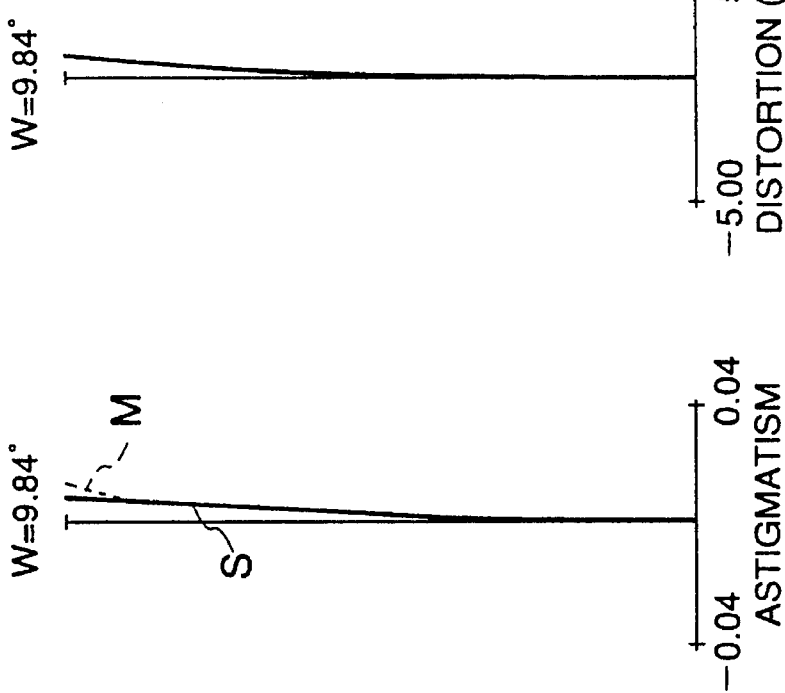
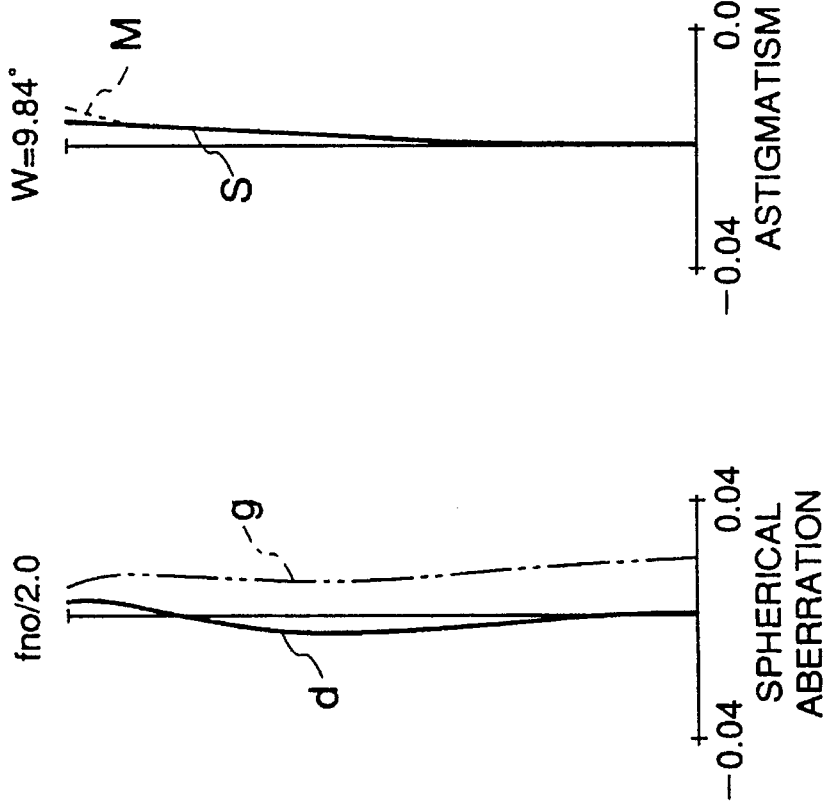

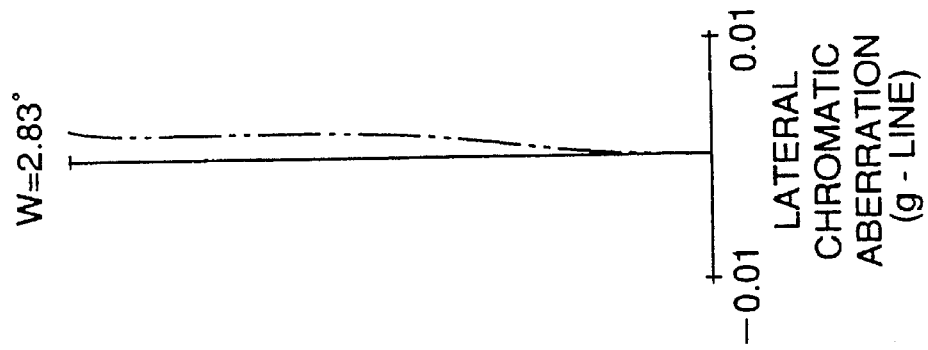
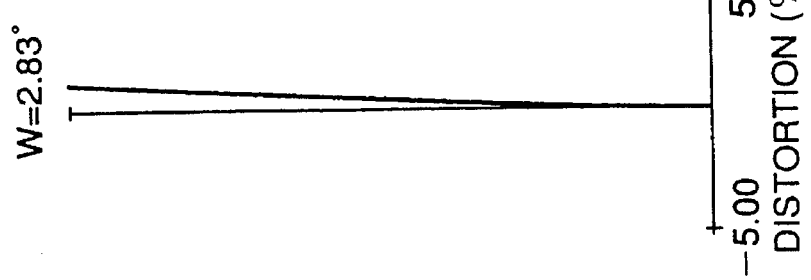
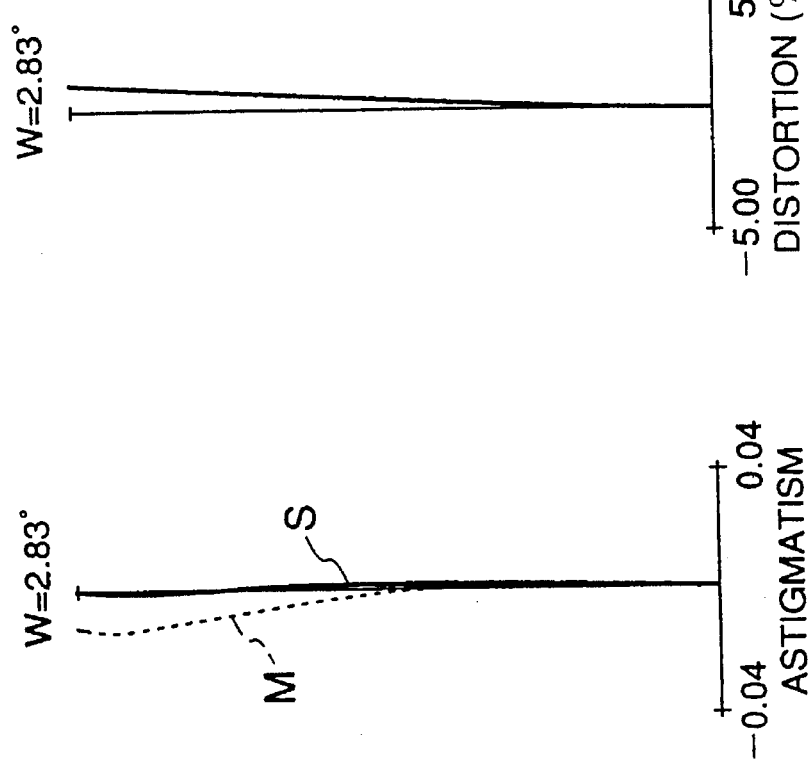
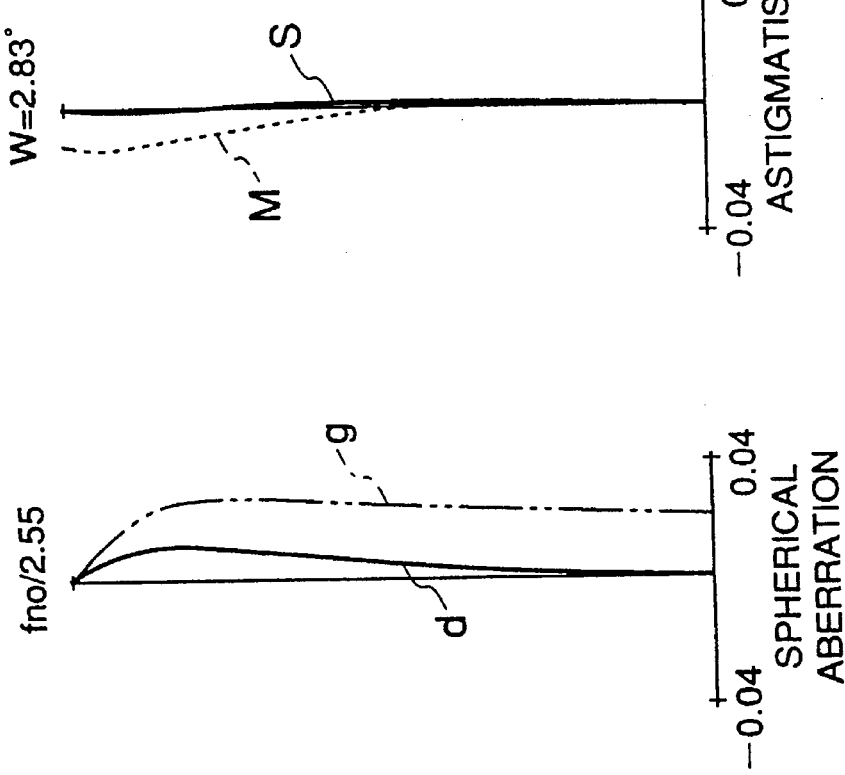

REAR-FOCUS TYPE ZOOM LENS WITH MOVABLE SECOND AND FOURTH LENS UNITS FOR ZOOMING AND FOCUSING

BACKGROUND OF THE INVENTION

1. Field of the Invention

This invention relates to a rear focus type zoom lens, and particularly to a rear focus type zoom lens which is used for photography, a video camera or the like and which secures a high variable power ratio and yet is short in full length and compact as a whole.

2. Related Background Art

Recently, with the tendency of home video camera and the like toward compactness and lighter weight, a striking advance has been seen in the downsizing of image pickup zoom lenses and particularly, efforts have been concentrated on the shortening of the full length, the downsizing of the diameter of the fore lens and the simplification of the construction.

A so-called rear focus type zoom lens in which the lens units other than the object side first lens unit are moved to effect focusing is known as a means for achieving these purposes.

Generally, the rear focus type zoom lens, as compared with a zoom lens in which a first lens unit is moved to effect focusing, is small in the effective diameter of the first lens unit, and it is easy to downsize the whole lens system. Also, it enables close-up photographing, particularly very close-up photographing to be accomplished and further, this is done with a relatively compact and light-weight lens unit moved and therefore, the required drive force for the lens unit may be small and quick focusing can be accomplished.

As such a rear focus type zoom lens, for example, Japanese Laid-Open Patent Application No. 62-206516, Japanese Laid-Open Patent Application No. 62-215225 and Japanese Laid-Open Patent Application No. 62-24213 disclose a zoom lens which has, in succession from the object side, a positive first lens unit, a negative second lens unit, a positive third lens unit and a positive fourth lens unit and in which the second lens unit is moved to effect a magnification change and the fluctuation of the image plane resulting from the magnification change is corrected and focusing is effected by the fourth lens unit.

Also, in single-focus lenses, for example, telephoto lenses or the like, as means for shortening the full length, there is known a lens arranged called the telephoto type in which a positive lens unit is disposed on the object side and a negative lens unit is disposed on the image plane side and the principal point position of the whole system is located on the object side to thereby earn the telephoto ratio. On the other hand, Japanese Laid-Open Patent Application No. 4-026811 and Japanese Laid-Open Patent Application No. 4-88309 propose a telephoto type in the master lens system of a zoom lens by disposing a convex lens unit on the object side of a third lens unit and disposing a concave lens in the rearmost portion, thereby shortening the full length of the zoom lens. Also, Japanese Laid-Open Patent Application No. 4-43311, Japanese Laid-Open Patent Application No. 4-153615, Japanese Laid-Open Patent Application No. 4-19165, Japanese Laid-Open Patent Application No. 5-27167 and Japanese Laid-Open Patent Application No. 5-60973 disclose examples in which a fourth lens unit is comprised of a positive lens or two positive lenses. Also, Japanese Laid-Open Patent Application No. 5-60974 discloses a zoom lens in which a fourth lens unit is comprised of two positive and negative lenses.

As described above, generally in zoom lenses, the so-called rear focus type is better suited for achieving the downsizing of the fore lens diameter and the whole system than the focusing by the movement of the first lens unit.

However, in Japanese Laid-Open Patent Application No. 4-026811 and Japanese Laid-Open Patent Application No. 4-88309, the fourth lens unit has been comprised of three lenses, i.e., a negative lens, a positive lens and a positive lens, and therefore further downsizing has been desired.

Also, in the zoom lenses disclosed in Japanese Laid-Open Patent Application No. 4-43311, Japanese Laid-Open Patent Application No. 4-153615, Japanese Laid-Open Patent Application No. 4-19165, Japanese Laid-Open Patent Application No. 5-27167 and Japanese Laid-Open Patent Application No. 5-60973, the zoom ratio is of the order of six to eight times and in zoom lenses of higher variable power than this, the fluctuation by the variable power of chromatic aberration becomes too great and it has been difficult to make the zoom lenses display a sufficient optical performance. Also, in the example disclosed in Japanese Laid-Open Patent Application No. 5-60974, both of the third lens unit and the fourth lens unit adopt an aspherical lens and therefore, for their high manufacturing costs, the zoom ratio has been of the order of eight times and sufficiently high variable power has neither been achieved.

SUMMARY OF THE INVENTION

It is the object of the present invention to propose improvements in the above-described examples of the prior art, particularly, Japanese Laid-Open Patent Application No. 4-026811, and to provide a rear focus type zoom lens which maintains a good optical performance over the entire zoom area and the entire object distance and yet which is compact and achieves still higher variable power.

To achieve the above object of the present invention, in a zoom lens which comprises, in succession from the object side, a first lens unit of positive refractive power, a second lens unit of negative refractive power, a third lens unit of positive refractive power having a stop, and a fourth lens unit of positive refractive power and in which the second lens unit and the fourth lens unit are moved to effect zooming and the fourth lens unit is moved to effect focusing, the third lens unit is comprised of at least two positive lenses and a negative lens which is most adjacent to the image plane side, and the fourth lens unit is comprised of a positive lens and a negative lens.

BRIEF DESCRIPTION OF THE DRAWINGS

FIG. 1 is a cross-sectional view of the lens of numerical value embodiment 1 of the present invention.

FIGS. 2A to 2L show various aberrations in numerical value embodiment 1.

FIGS. 4A to 4L show various aberrations in numerical value embodiment 2.

FIG. 5 is a cross-sectional view of the lens of numerical value embodiment 3 of the present invention.

FIGS. 6A to 6L show various aberrations in numerical value embodiment 3.

FIGS. 8A to 8L show various aberrations in numerical value embodiment 4.

FIGS. 10A to 10L show various aberrations in numerical value embodiment 5.

DESCRIPTION OF THE PREFERRED EMBODIMENTS

Some embodiments of the present invention will hereinafter be described with reference to the drawings.

Figure 3:
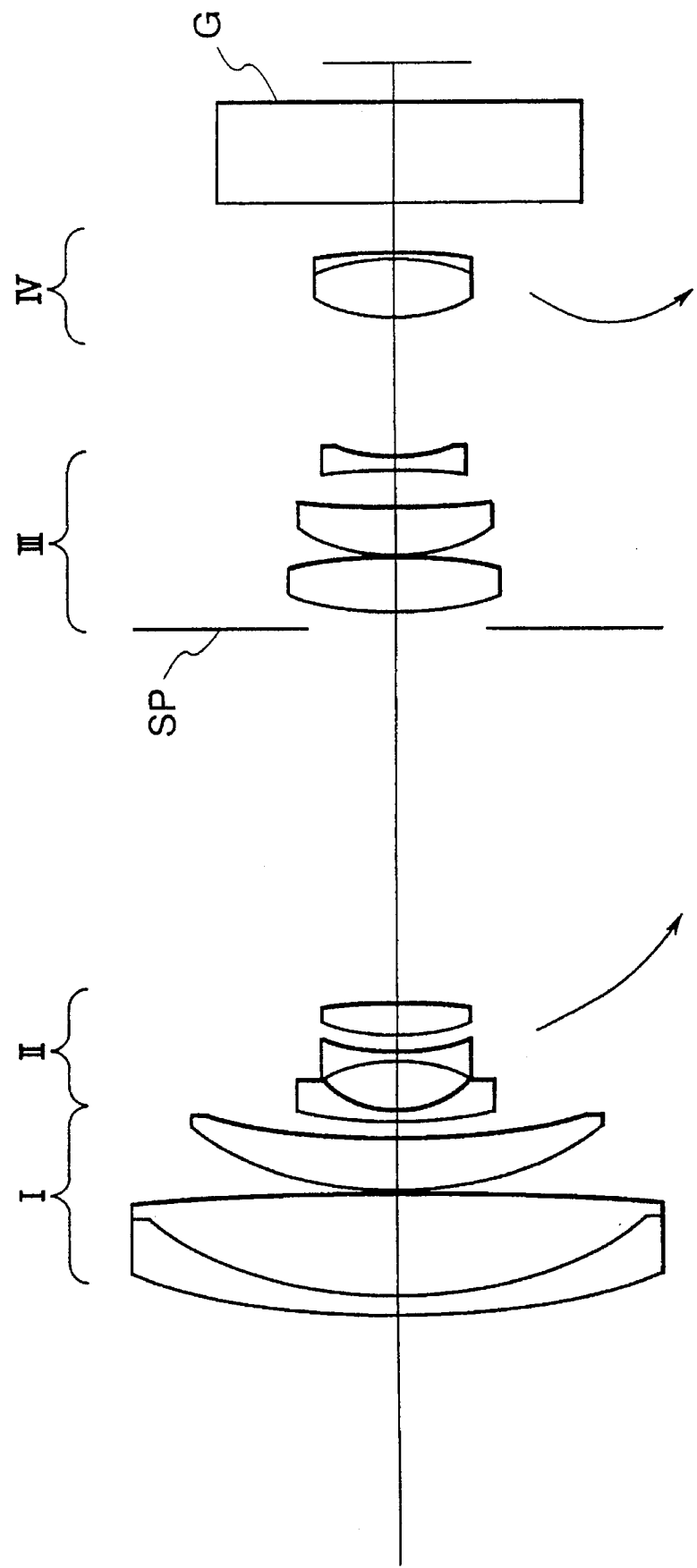
FIG. 3 is a cross-sectional view of the lens of numerical value embodiment 2 of the present invention.
Figure 7:
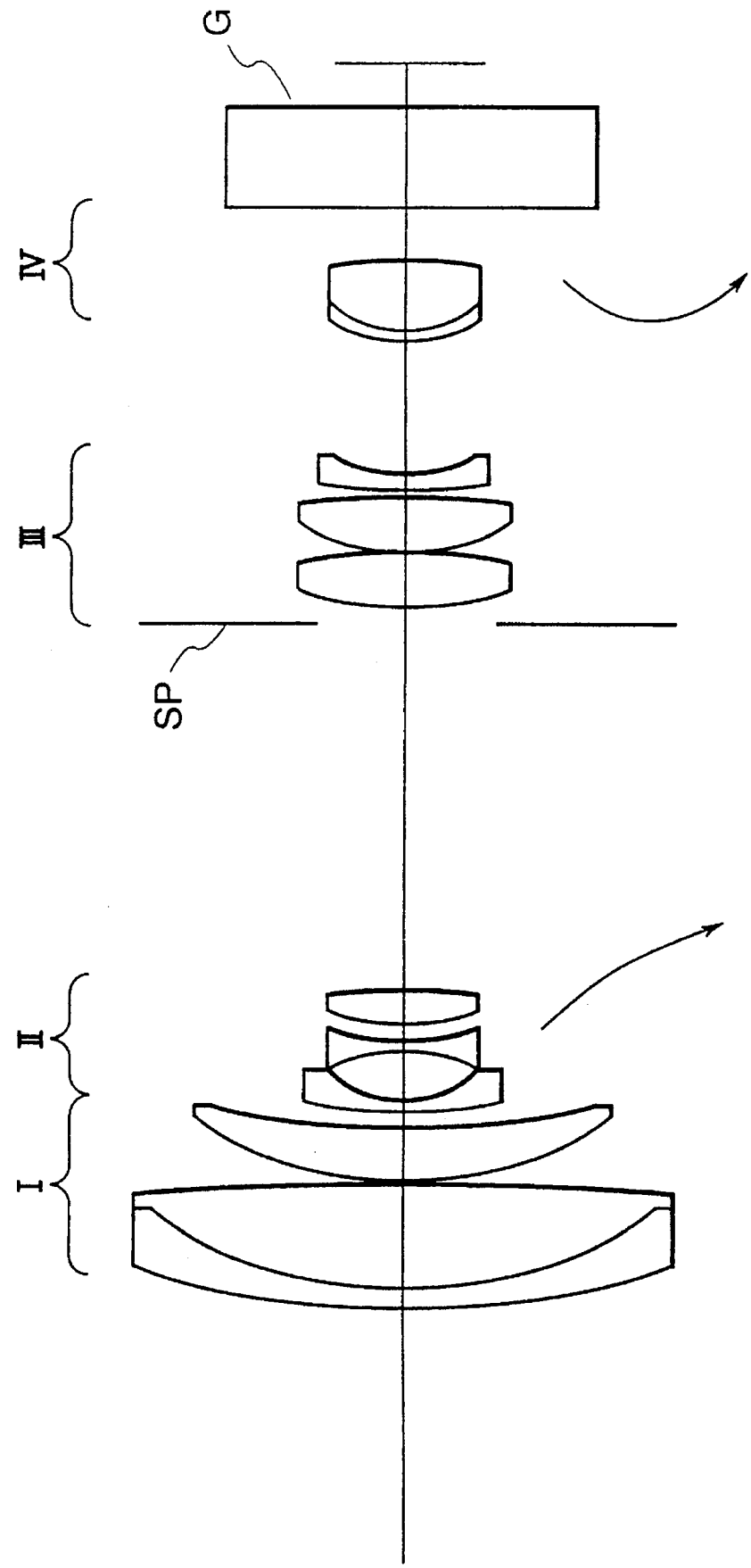
FIG. 7 is a cross-sectional view of the lens of numerical value embodiment 4 of the present invention.
Figure 9:
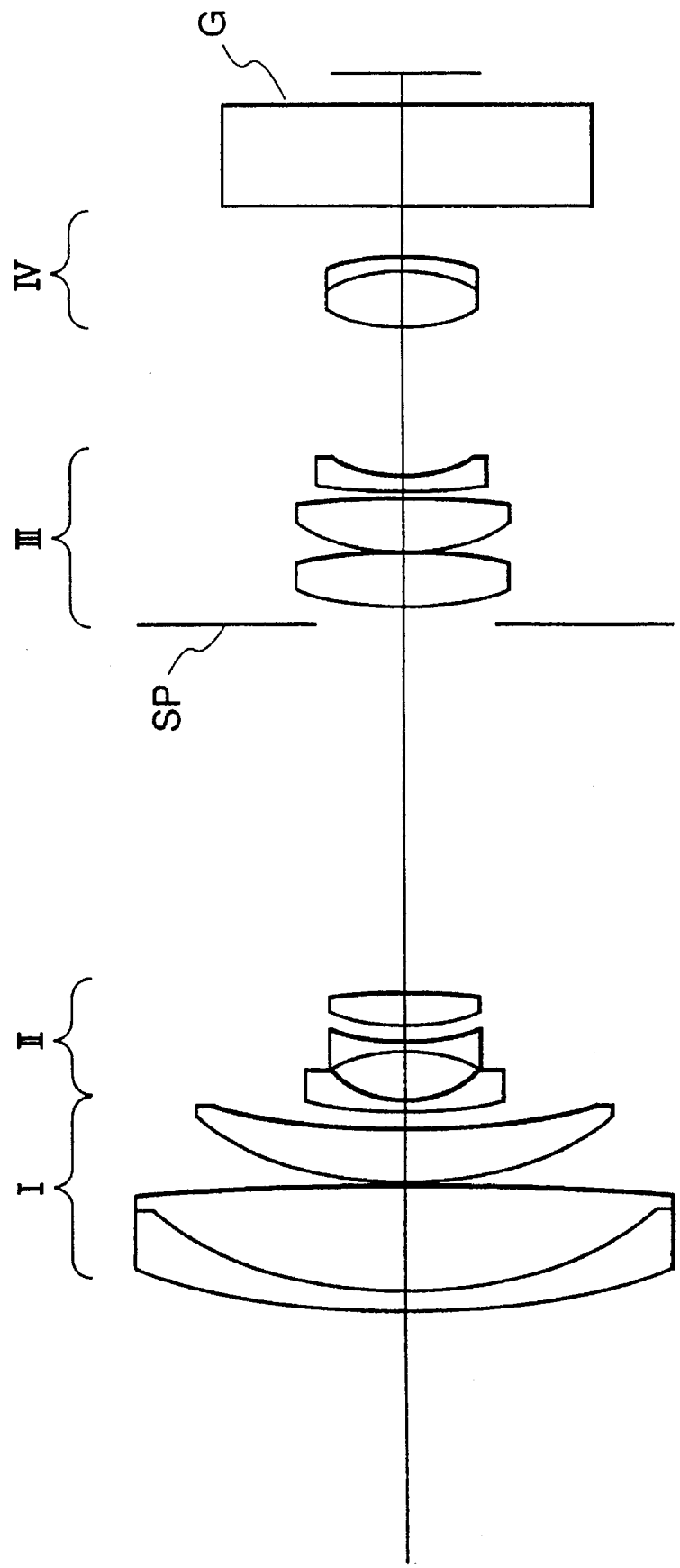
FIG. 9 is a cross-sectional view of the lens of numerical value embodiment 5 of the present invention.

FIGS. 1, 3, 5, 7 and 9 show the cross-sections of the lenses of numerical value embodiments 1 to 5 of the present invention. FIGS. 2A to 2L, FIGS. 4A to 4L, FIGS. 6A to 6L, FIGS. 8A to 8L, and FIGS. 10A to 10L show various aberrations in numerical value embodiments 1 to 5, FIGS. 2A to 2D, FIGS. 4A to 4D, FIGS. 6A to 6D, FIGS. 8A to 8D and FIGS. 10A to 10D show the aberrations at the wide angle end, FIGS. 2E to 2H, FIGS. 4E to 4H, FIGS. 6E to 6H, FIGS. 8E to 8H and FIGS. 10E to 10H show the aberrations at the intermediate zoom position, and FIGS. 2I to 2L, FIGS. 4I to 4L, FIGS. 6I to 6L, FIGS. 8I to 8L and FIGS. 10I to 10L show the aberrations at the telephoto end wherein "d", "g", "S" and "M" are respectively directed to D-lines, G-lines, sagittal ray and meridional ray.

In each cross-sectional view of the lens, I designates a first lens unit having positive refractive power, II denotes a second lens unit having negative refractive power, III designates a third lens unit having positive refractive power, IV denotes a fourth lens unit having positive refractive power, and G designates an optical member such as an infrared cut filter or an optical low-pass filter.

Zooming from the wide angle side to the telephoto side is effected by the second lens unit II and the fourth lens unit IV being moved along movement loci indicated by arrows. The first lens unit I and the third lens unit III are always stationary.

In Embodiments 1 and 4, two positive lenses and a negative lens are disposed in succession in the third lens unit and the fourth lens unit is comprised of a negative lens and a positive lens. In this case, in order to make further aberration correction possible, an aspherical lens is adopted in the third lens unit.

In Embodiments 3 and 5, two positive lenses and a negative lens are disposed in the third lens unit, a positive lens and a negative lens are disposed in the fourth lens unit, and a substantially telephoto type is adopted in the fourth lens unit as well to thereby shorten the full length. In order to accomplish better aberration correction, an aspherical lens is adopted in the third lens unit.

In Embodiment 2, two positive lenses and a negative lens are disposed in the third lens unit, a positive lens and a negative lens are disposed in the fourth lens unit, and a substantially telephoto type is adopted in the fourth lens unit as well to thereby shorten the full length, and yet in order to accomplish better aberration correction, an aspherical lens is adopted in the fourth lens unit.

The aspherical surface is basically directed to the correction of spherical aberration and therefore, it is desirable that the aspherical lens be of such a shape that positive refractive power becomes weaker toward the marginal portion of the lens.

As described above, the telephoto type is effective as a technique for shortening the full length, but to achieve it in a zoom lens, it is desirable that the telephoto type be a variable power portion or subsequent portion. Accordingly, in the present invention, it is desirable that in the third lens unit, a positive lens unit be disposed on the object side and a negative lens be disposed most adjacent to the image plane side and that when the focal lengths of the negative lens and the third lens unit are fN and f3, respectively, the condition that $$0.5 < |fN/f3| < 1.0 \quad (1)$$

be satisfied, whereby the principal point position of the third lens unit be brought toward the object side to thereby achieve the shortening of the whole system. It is preferable that the last negative lens in the third lens unit have its concave surface of sharper curvature face the image plane side.

The above conditional expression shows the relation between the refractive power of the negative lens in the third lens unit and the telephoto ratio of this lens unit, and if the lower limit value of this conditional expression is exceeded, spherical aberration could not be completely corrected, and if the upper limit value of this conditional expression is exceeded, the telephoto ratio could not be sufficiently achieved.

Also, the fluctuation of chromatic aberration by a magnification change is made correctable by constructing the fourth lens unit of two lenses, i.e., a negative lens and a positive lens.

A further effective condition is that when the composite focal length of the first lens unit to the third lens unit is fAM and the focal length of the whole system is fM, the condition that $$0 < fM/fAM < 1.0 \quad (2)$$

should be satisfied.

However, when the focal lengths of the whole system at the wide angle end and the telephoto end and the focal lengths of the first lens unit to the third lens unit at the wide angle end and the telephoto end are fW, fT, fAW and fAT, respectively, fM and fAM are given by $$fM = \sqrt{(fW \cdot fT)} \quad \text{and} fAM = \sqrt{(fAW \cdot fAT)} .$$

The lower limit value of conditional expression (2) means that the composite focal length of the first lens unit to the third lens unit is a converging system over the wide angle end to the telephoto end, and if the lower limit value of this conditional expression is exceeded, the composite focal length will become a partially converging system and the full length will increase, and this is not preferable. The upper limit value of conditional expression (2) shows the degree of convergence at the mean position of the wide angle end and the telephoto end, and if the upper limit value of this conditional expression is exceeded, the back focal length will become too short and the working distance of crystal, a face plate or the like to be inserted before the image pickup element could not be secured.

To achieve the shortening of the full length more effectively, when the focal length of the third lens unit is F3 and the full length (including the back focal length) of the third lens unit singly is L3, it is desirable that the condition that $$0.7 < F3/L3 < 1.2 \quad (3)$$

be satisfied.

This conditional expression is an expression corresponding to the so-called telephoto ratio, and if the lower limit value thereof is exceeded, the telephoto ratio will be achieved too much and the high-order fluctuation of spherical aberration could not be suppressed completely, and if the upper limit value of this conditional expression is exceeded, it will become impossible to achieve the shortening of the full length which is the object of the present invention.

Also, it is necessary to increase the refractive power of the negative lens most adjacent to the image plane side to earn the telephoto ratio of the third lens unit, and in this case, when the refractive index of the negative lens in the third lens unit which is most adjacent to the image plane side is N3N, it is desirable that the condition that $$N3N>1.80 \quad (4)$$

be satisfied.

That is, if the lower limit value of this conditional expression is exceeded, the curvature of the negative lens will become too sharp and high-order coma flare could not be corrected completely, and this is not preferable.

Further, to suppress the fluctuation of chromatic aberration caused by a magnification change, when the difference between the Abbe numbers of the positive lens and negative lens in the fourth lens unit is Δv4, it is desirable that the condition that $$\Delta v4>20.0 \quad (5)$$

be satisfied.

In the case of a low magnification zoom lens, if the fluctuation factors of chromatic aberration are set so as to cancelled by the front unit and the rear unit, it will be possible to keep the overall optical performance even if chromatic aberration is residual in each lens unit to a certain extent, while in the case of a high magnification zoom lens, to suppress the fluctuation of chromatic aberration caused by a magnification change, it is necessary to suppress chromatic aberration in advance by each lens unit. Particularly the fourth lens unit is also utilized for focusing and therefore, good correction of chromatic aberration is desirable in this lens unit. That is, if the lower limit value of conditional expression (5) is exceeded, residual chromatic aberration will be increased by the telephoto end and focusing and it will become impossible to maintain a good optical performance.

Also, the shortening of the full length is an important factor in the first lens unit as well, and when the thickness of the first lens unit is D, it is desirable that $$1.5<D/fW<2.5 \quad (6)$$

be satisfied. That is, if the first lens unit is too thick, the diameter of the fore lens will tend to increase in order to secure an oblique beam of light during the wide angle, and this is not preferable. If the first lens becomes thin beyond the lower limit of conditional expression (6), an increase in F-number during the telephotography will result and it will become impossible to achieve a great aperture, and this is not preferable.

The embodiments of the present invention will be described below.

In the numerical value embodiments below, ri represents the radius of curvature of the ith lens surface from the object side, di represents the thickness and air gap of the ith lens from the object side, and ni and vi are the refractive power and Abbe number, respectively, of the ith lens from the object side.

The aspherical shape is expressed by the expression that $$X = \frac{(1/r)Y^2}{1+\sqrt{1-(1+A)(Y/r)^2}} + BY^4 + CY^6 + DY^8 + EY^{10}$$

when the direction of the optical axis is X-axis, the direction perpendicular to the optical axis is Y-axis. the direction of travel of light is positive, the point of intersection between the vertex of the lens and X-axis is the origin, r is the paraxial radius of curvature of the lens surface, and A, B, C, D and E are aspherical surface coefficients.

Also, for example, an indication "e-03" means "$10^{-3}$". Also, G(r23, r24, etc.) in the numerical value embodiments indicates the optical filter, the face plate or the like. For information, the values of the respective numerical value embodiments corresponding to the conditional expressions of the present invention are shown below.

TABLE 1

|  | EMBODIMENT 1 | EMBODIMENT 2 | EMBODIMENT 3 | EMBODIMENT 4 | EMBODIMENT 5 |
| --- | --- | --- | --- | --- | --- |
| $|f_N/f_3|$ | 0.818 | 0.531 | 0.858 | 0.749 | 0.768 |
| fM/fAM | 0.450 | 0.198 | 0.303 | 0.433 | 0.447 |
| F3/D3 | 1.073 | 0.967 | 1.018 | 1.078 | 1.068 |
| N3n | 1.805 | 1.847 | 1.805 | 1.805 | 1.805 |
| δv4 | 40.4 | 35.6 | 27.0 | 23.2 | 27.0 |
| D/fW | 2.004 | 2.063 | 2.058 | 1.974 | 2.030 |

| Numerical Value Embodiment 1 | | | |
| --- | --- | --- | --- |
| f = 1 ~ 12 | fno = 1:1.85 ~ 2.58 | 2ω = 61.0° ~ 5.62° | |
| r1 = 9.3897 | d1 = 0.2554 | n1 = 1.84666 | v1 = 23.8 |
| r2 = 4.9463 | d2 = 1.1395 | n2 = 1.60311 | v2 = 60.7 |
| r3 = −41.5252 | d3 = 0.0393 | | |
| r4 = 4.0366 | d4 = 0.5697 | n3 = 1.69680 | v3 = 55.5 |
| r5 = 9.6212 | d5 = (variable) | | |
| r6 = 6.6736 | d6 = 0.1179 | n4 = 1.88300 | v4 = 40.8 |
| r7 = 1.2243 | d7 = 0.5206 | | |
| r8 = −2.1809 | d8 = 0.1179 | n5 = 1.71300 | v5 = 53.8 |
| r9 = 2.1809 | d9 = 0.1965 | | |
| r10 = 2.7665 | d10 = 0.3340 | n6 = 1.84666 | v6 = 23.8 |
| r11 = −19.2755 | d11 = (variable) | | |

-continued

Numerical Value Embodiment 1

| r12 = (stop) | d12 = 0.22 | | |
|---|---|---|---|
| *r13 = 3.4259 | d13 = 0.5697 | n7 = 1.58313 | v7 = 59.4 |
| r14 = −7.2054 | d14 = 0.0295 | | |
| r15 = 2.2478 | d15 = 0.5501 | n8 = 1.63854 | v8 = 55.4 |
| r16 = −18.2320 | d16 = 0.1091 | | |
| r17 = 5.8076 | d17 = 0.1375 | n9 = 1.80518 | v9 = 25.4 |
| r18 = 1.5742 | d18 = (variable) | | |
| r19 = 1.7973 | d19 = 0.1375 | n10 = 1.84666 | v10 = 23.8 |
| r20 = 1.4000 | d20 = 0.0393 | | |
| r21 = 1.6380 | d21 = 0.5108 | n11 = 1.51633 | v11 = 64.2 |
| r22 = −7.5180 | d22 = 0.5894 | | |
| r23 = ∞ | d23 = 0.9823 | n12 = 1.51633 | v12 = 64.2 |
| r24 = ∞ | | | |

| Focal Length Variable Distance | 1.00 | 3.43 | 12.02 |
|---|---|---|---|
| d5 | 0.18 | 2.56 | 3.97 |
| d11 | 4.04 | 1.66 | 0.26 |
| d18 | 1.80 | 0.77 | 1.54 |

(In a case where the 13th lens surface is aspherical)
A = 1.6807
B = −2.0709e − 02
C = −1.6438e − 03
D = −5.0373e − 04
E = 2.2230e − 04

Numerical Value Embodiment 2

| f = 1 ~ 12.8 | fno = 1:1.85 ~ 2.53 | 2ω = 62.5° ~ 5.75° | |
|---|---|---|---|
| r1 = 9.6519 | d1 = 0.2630 | n1 = 1.84666 | v1 = 23.8 |
| r2 = 5.1379 | d2 = 1.1732 | n2 = 1.60311 | v2 = 60.7 |
| r3 = −37.5887 | d3 = 0.0405 | | |
| r4 = 4.2987 | d4 = 0.5866 | n3 = 1.69680 | v3 = 55.5 |
| r5 = 10.4626 | d5 = (variable) | | |
| r6 = 6.6585 | d6 = 0.1214 | n4 = 1.88300 | v4 = 40.8 |
| r7 = 1.2109 | d7 = 0.5360 | | |
| r8 = −2.3065 | d8 = 0.1214 | n5 = 1.71300 | v5 = 53.8 |
| r9 = 2.3065 | d9 = 0.2023 | | |
| r10 = 2.7604 | d10 = 0.3439 | n6 = 1.84666 | v6 = 23.8 |
| r11 = −36.5613 | d11 = (variable) | | |
| r12 = (stop) | d12 = 0.22 | | |
| r13 = 3.8882 | d13 = 0.6068 | n7 = 1.69680 | v7 = 55.5 |
| r14 = −5.6727 | d14 = 0.0303 | | |
| r15 = 1.9474 | d15 = 0.5562 | n8 = 1.60311 | v8 = 60.7 |
| r16 = 11.1719 | d16 = 0.3918 | | |
| r17 = −5.1330 | d17 = 0.1416 | n9 = 1.84666 | v9 = 23.8 |
| r18 = 2.3260 | d18 = (variable) | | |
| *r19 = 3.4236 | d19 = 0.5866 | n10 = 1.58313 | v10 = 59.4 |
| r20 = −2.0328 | d20 = 0.1214 | n11 = 1.84666 | v11 = 23.8 |
| r21 = −2.4824 | d21 = 0.6068 | | |
| r22 = ∞ | d22 = 1.0113 | n12 = 1.51633 | v12 = 64.2 |
| r23 = ∞ | | | |

| Focal Length Variable Distance | 1.00 | 3.46 | 12.08 |
|---|---|---|---|
| d5 | 0.18 | 2.64 | 4.08 |
| d11 | 4.17 | 1.71 | 0.26 |
| d18 | 1.60 | 0.63 | 1.22 |

(In a case where the 19th lens surface is aspherical)
A = 0.1933
B = −3.4852e − 02
C = −1.5989e − 02
D = 3.2545e − 02
E = −2.6019e − 02

| Numerical Value Embodiment 3 | | | |
|---|---|---|---|
| f = 1 ~ 11.67 | fno = 1:1.85 ~ 2.47 | 2ω = 61.15° ~ 5.8° | |
| r1 = 12.6870 | d1 = 0.2560 | n1 = 1.84666 | v1 = 23.8 |
| r2 = 5.2112 | d2 = 1.1423 | n2 = 1.63854 | v2 = 55.4 |
| r3 = −35.1186 | d3 = 0.0394 | | |
| r4 = 4.4994 | d4 = 0.6204 | n3 = 1.69680 | v3 = 55.5 |
| r5 = 15.5712 | d5 = (variable) | | |
| r6 = 26.8666 | d6 = 0.1182 | n4 = 1.88300 | v4 = 40.8 |
| r7 = 1.3267 | d7 = 0.5219 | | |
| r8 = −3.2740 | d8 = 0.1182 | n5 = 1.77250 | v5 = 49.6 |
| r9 = 1.3426 | d9 = 0.5515 | n6 = 1.84666 | v6 = 23.8 |
| r10 = −65.84475 | d10 = (variable) | | |
| r11 = (stop) | d11 = 0.22 | | |
| *r12 = 3.280 | d12 = 0.3939 | n7 = 1.69680 | v7 = 55.5 |
| r13 = 10.9906 | d13 = 0.0295 | | |
| r14 = 2.0327 | d14 = 0.6499 | n8 = 1.63854 | v8 = 55.4 |
| r15 = −7.1460 | d15 = 0.1102 | | |
| r16 = 3.4454 | d16 = 0.1379 | n9 = 1.80518 | v9 = 25.4 |
| r17 = 1.4228 | d17 = (variable) | | |
| r18 = 3.6268 | d18 = 0.6696 | n10 = 1.51742 | v10 = 52.4 |
| r19 = −1.2409 | d19 = 0.1182 | n11 = 1.80518 | v11 = 25.4 |
| r20 = −2.1064 | d20 = 0.5908 | | |
| r21 = ∞ | d21 = 0.9847 | n12 = 1.51633 | v12 = 64.2 |
| r22 = ∞ | | | |

| Focal Length Variable Distance | 1.00 | 3.48 | 11.66 |
|---|---|---|---|
| d5 | 0.27 | 2.65 | 4.06 |
| d10 | 4.05 | 1.66 | 0.26 |
| d17 | 1.63 | 0.65 | 1.24 |

(In a case where the 12th lens surface is aspherical)
A = 2.3706
B = −2.6268e − 02
C = −1.2425e − 04
D = −2.3317e − 03
E = −6.9023e − 04

| Numerical Value Embodiment 4 | | | |
|---|---|---|---|
| f = 1 ~ 11.98 | fno = 1:1.85 ~ 2.61 | 2ω = 61.03° ~ 5.63° | |
| r1 = 9.0374 | d1 = 0.2554 | n1 = 1.84666 | v1 = 23.8 |
| r2 = 4.7492 | d2 = 1.0806 | n2 = 1.60311 | v2 = 60.7 |
| r3 = −91.1602 | d3 = 0.0393 | | |
| r4 = 4.1983 | d4 = 0.5992 | n3 = 1.71300 | v3 = 53.8 |
| r5 = 11.4013 | d5 = (variable) | | |
| r6 = 7.3787 | d6 = 0.1179 | n4 = 1.83481 | v4 = 42.7 |
| r7 = 1.1897 | d7 = 0.5206 | | |
| r8 = −2.2785 | d8 = 0.1179 | n5 = 1.77250 | v5 = 49.6 |
| r9 = 2.2785 | d9 = 0.1681 | | |
| r10 = 2.7355 | d10 = 0.3536 | n6 = 1.84666 | v6 = 23.8 |
| r11 = −10.9582 | d11 = (variable) | | |
| r12 = ∞ (stop) | d12 = 0.22 | | |
| *r13 = 4.7866 | d13 = 0.5330 | n7 = 1.58313 | v7 = 59.4 |
| r14 = −6.1386 | d14 = 0.0295 | | |
| r15 = 2.1946 | d15 = 0.6133 | n8 = 1.63854 | v8 = 55.4 |
| r16 = −8.7737 | d16 = 0.0977 | | |
| r17 = 10.0688 | d17 = 0.1375 | n9 = 1.80518 | v9 = 25.4 |
| r18 = 1.7171 | d18 = (variable) | | |
| r19 = 1.9982 | d19 = 0.1179 | n10 = 1.80610 | v10 = 41.0 |
| r20 = 1.1685 | d20 = 0.7419 | n11 = 1.51633 | v11 = 64.2 |
| r21 = −5.0740 | d21 = 0.5894 | | |
| r22 = ∞ | d22 = 0.9823 | n12 = 1.51633 | v12 = 64.2 |
| r23 = ∞ | | | |

| Focal Length Variable Distance | 1.00 | 3.49 | 11.98 |
|---|---|---|---|
| d5 | 0.18 | 2.57 | 3.97 |
| d11 | 4.05 | 1.66 | 0.26 |
| d18 | 1.50 | 0.55 | 1.41 |

-continued

Numerical Value Embodiment 4

(In a case where the 13th lens surface is aspherical)
A = 6.1540
B = -2.2087e - 02
C = -4.4972e - 03
D = 7.2480e - 04
E = -3.4252e - 04

Numerical Value Embodiment 5

| f = 1 ~ 11.92 | fno = 1:1.85 ~ 2.55 | 2ω = 60.94° ~ 5.65° | |
|---|---|---|---|
| r1 = 9.5302 | d1 = 0.2549 | n1 = 1.84666 | v1 = 23.8 |
| r2 = 4.9271 | d2 = 1.1374 | n2 = 1.60311 | v2 = 60.7 |
| r3 = -41.7475 | d3 = 0.0392 | | |
| r4 = 4.1033 | d4 = 0.5981 | n3 = 1.71300 | v3 = 53.8 |
| r5 = 10.1672 | d5 = (variable) | | |
| r6 = 7.0617 | d6 = 0.1177 | n4 = 1.88300 | v4 = 40.8 |
| r7 = 1.2044 | d7 = 0.5171 | | |
| r8 = -2.3002 | d8 = 0.1177 | n5 = 1.77250 | v5 = 49.6 |
| r9 = 2.3001 | d9 = 0.1646 | | |
| r10 = 2.7532 | d10 = 0.3530 | n6 = 1.84666 | v6 = 23.8 |
| r11 = -11.8437 | d11 = (variable) | | |
| r12 = (stop) | d12 = 0.1961 | | |
| *r13 = 3.4277 | d13 = 0.5393 | n7 = 1.58313 | v7 = 59.4 |
| r14 = -9.9880 | d14 = 0.0294 | | |
| r15 = 2.1302 | d15 = 0.6079 | n8 = 1.63854 | v8 = 55.4 |
| r16 = -10.1972 | d16 = 0.1310 | | |
| r17 = 4.4009 | d17 = 0.1373 | n9 = 1.80518 | v9 = 25.4 |
| r18 = 1.3626 | d18 = (variable) | | |
| r19 = 2.7785 | d19 = 0.6275 | n10 = 1.51742 | v10 = 52.4 |
| r20 = -1.5696 | d20 = 0.1171 | n11 = 1.80518 | v11 = 25.4 |
| r21 = -2.9034 | d21 = 0.5883 | | |
| r22 = ∞ | d22 = 0.9805 | n12 =0 1.51633 | v12 = 64.2 |
| r23 = ∞ | | | |

| Focal Length Variable Distance | 1.00 | 3.39 | 11.92 |
|---|---|---|---|
| d5 | 0.19 | 2.54 | 3.93 |
| d11 | 4.01 | 1.65 | 0.27 |
| d18 | 1.68 | 0.68 | 1.45 |

(In a case where the 13th lens surface is aspherical)
A = 1.3257
B = -2.2518e - 02
C = -3.3588e - 03
D = 1.8532e - 04
E = -1.5083e - 04

By constructing the zoom lens as described above, it has become possible to provide a rear focus type zoom lens which secures a high variable power ratio and yet has a good performance over the entire zoom area and the entire object distance and is short in full length.

What is claimed is:

1. A rear focus type zoom lens comprising in succession from the object side, a first lens unit of positive refractive power, a second lens unit of negative refractive power, a third lens unit of positive refractive power, said third lens unit having at least two positive lenses and a negative lens, said negative lens of said third lens unit being disposed at a position which is closest to the image plane side of all lenses of said third lens unit, wherein a radius of curvature of an image plane side surface of said negative lens of said third lens unit is shorter than a radius of curvature of an object side surface of said negative lens of said third lens unit, and a fourth lens unit of positive refractive power consisting of a positive lens and a negative lens, said second lens unit and said fourth lens unit being moved to effect zooming, and said fourth lens unit being moved to effect focusing.

2. A rear focus type zoom lens according to claim 1, wherein at least one aspherical lens is used in said third lens unit.

3. A rear focus type zoom lens according to claim 1, wherein at least one aspherical lens is used in said fourth lens unit.

4. A rear focus type zoom lens according to claim 2, wherein said third lens unit comprises, in succession from the object side, two positive lenses and a negative lens, said negative lens of said third lens unit having a concave surface of sharper curvature facing the image plane side, and when the focal lengths of said negative lens of said third lens unit and said third lens unit are fN and f3, respectively, the conditional expression that $$0.5 < |fN/f3| < 1.0$$

is satisfied.

5. A rear focus type zoom lens according to claim 3, wherein said third lens unit comprises, in succession from the object side, two positive lenses and a negative lens, said negative lens of said third lens unit having a concave surface of sharper curvature facing the image plane side, and when the focal lengths of said negative lens of said third lens unit and said third lens unit are fN and f3, respectively, the conditional expression that $$0.5 < |fN/f3| < 1.0$$

is satisfied.

6. A rear focus type zoom lens according to claim 1, wherein when the composite focal length of said first lens unit to said third lens unit is fAM and the focal length of the rear focus type zoom lens is fM, the conditional expression that $$0 < fM/fAM < 1.0$$

is satisfied, and when the focal lengths of the rear focus type zoom lens at the wide angle end and the telephoto end and the focal lengths of said first lens unit to said third lens unit at the wide angle end and the telephoto end are fW, fT, fAW and fAT, respectively, fM and fAM are given by $$fM = \sqrt{(fW \times fT)} \text{ and } fAM = \sqrt{(fAW \times fAT)}.$$

7. A rear focus type zoom lens according to claim 1, wherein when the refractive index of said negative lens in said third lens unit which is disposed closest to the image side of all lenses of said third lens unit is N3N, the condition N3N>1.80 is satisfied.

8. A rear focus type zoom lens according to claim 1, wherein said third lens unit includes a stop.

\* \* \* \* \*

UNITED STATES PATENT AND TRADEMARK OFFICE
CERTIFICATE OF CORRECTION

PATENT NO. : 5,583,697
DATED : December 10, 1996
INVENTOR(S) : HITOSHI MUKAIYA

It is certified that error appears in the above-indentified patent and that said Letters Patent is hereby corrected as shown below:

COLUMN 1:

Line 15, "of" should read --of the--.

COLUMN 5:

Line 30, "to" should read --to be--.

COLUMN 11:

Line 34, "n12=0 1.51633" should read --n12=1.51633--.

Signed and Sealed this

Tenth Day of June, 1997

Attest:

BRUCE LEHMAN

Attesting Officer

Commissioner of Patents and Trademarks